(12) United States Patent
Kamino et al.

(10) Patent No.: US 9,703,590 B2
(45) Date of Patent: Jul. 11, 2017

(54) INFORMATION PROCESSING APPARATUS INCLUDING BRIDGES THAT CONNECT VIRTUAL MACHINES AND PHYSICAL DEVICES, AND CONTROL METHOD THEREOF

(71) Applicant: FUJITSU LIMITED, Kawasaki-shi, Kanagawa (JP)

(72) Inventors: Tetsuya Kamino, Kawasaki (JP); Masakazu Yabe, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 14/540,269

(22) Filed: Nov. 13, 2014

(65) Prior Publication Data
US 2015/0074665 A1    Mar. 12, 2015

Related U.S. Application Data

(63) Continuation of application No. PCT/JP2012/063039, filed on May 22, 2012.

(51) Int. Cl.
| | | |
|---|---|---|
| *G06F 9/455* | (2006.01) | |
| *G06F 3/00* | (2006.01) | |
| *G06F 13/00* | (2006.01) | |
| *H04L 12/28* | (2006.01) | |
| *G06F 13/40* | (2006.01) | |

(52) U.S. Cl.
CPC ...... *G06F 9/45558* (2013.01); *G06F 13/4027* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 5,848,294 A | 12/1998 | Clark | |
| 6,453,392 B1 * | 9/2002 | Flynn, Jr. ............. | G06F 3/0619 409/104 |

(Continued)

FOREIGN PATENT DOCUMENTS

| | | |
|---|---|---|
| JP | 2-293954 A | 12/1990 |
| JP | 2004-252591 | 9/2004 |

(Continued)

OTHER PUBLICATIONS

Bob Blake; Choosing the Right Programmable Logic Solution for PCI Express Applications; RTC Magazine, Apr. 2005.*

(Continued)

*Primary Examiner* — Bing Zhao
(74) *Attorney, Agent, or Firm* — Fujitsu Patent Center

(57) ABSTRACT

When an access from a virtual machine to a VGA is detected, a table managing identification information of a bridge on each path from a CPU to each VGA and passage setting information indicating whether or not to permit the passage of each path is referred to, and table information and a state of each bridge are set such that the passage of the path from the CPU to an SVGA to be accessed by the corresponding virtual machine is permitted, and the access is executed. Therefore, collision of I/O addresses can be avoided while maintaining the state of connecting a plurality of VGAs with fixed I/O addresses to a plurality of virtual machines.

12 Claims, 15 Drawing Sheets

(56) References Cited

U.S. PATENT DOCUMENTS

| | | | |
|---|---|---|---|
| 6,976,087 B1 * | 12/2005 | Westfall | H04L 12/5695 370/351 |
| 2004/0187106 A1 | 9/2004 | Tanaka et al. | |
| 2009/0198862 A1 | 8/2009 | Okitsu et al. | |
| 2010/0165874 A1 * | 7/2010 | Brown | G06F 13/4022 370/254 |
| 2010/0228887 A1 | 9/2010 | Koike | |

FOREIGN PATENT DOCUMENTS

| | | |
|---|---|---|
| JP | 2008-269194 A | 11/2008 |
| JP | 2009-181418 | 8/2009 |
| JP | 2009-223793 A | 10/2009 |
| JP | 2010-205124 | 9/2010 |
| JP | 2011-204077 | 10/2011 |
| JP | 2011-204077 A | 10/2011 |
| JP | 2012-38037 A | 2/2012 |
| WO | 2010/044409 A1 | 4/2010 |

OTHER PUBLICATIONS

Japanese Office Action mailed Dec. 1, 2015 for corresponding Japanese Patent Application No. 2014-516552, with Partial English Translation, 8 pages.
International Search Report of PCT/JP2012/063039 mailed on Aug. 21, 2012.
Japanese Office Action mailed Apr. 5, 2016 for corresponding Japanese Patent Application No. 2014-516552, with Partial English Translation, 9 pages.

* cited by examiner

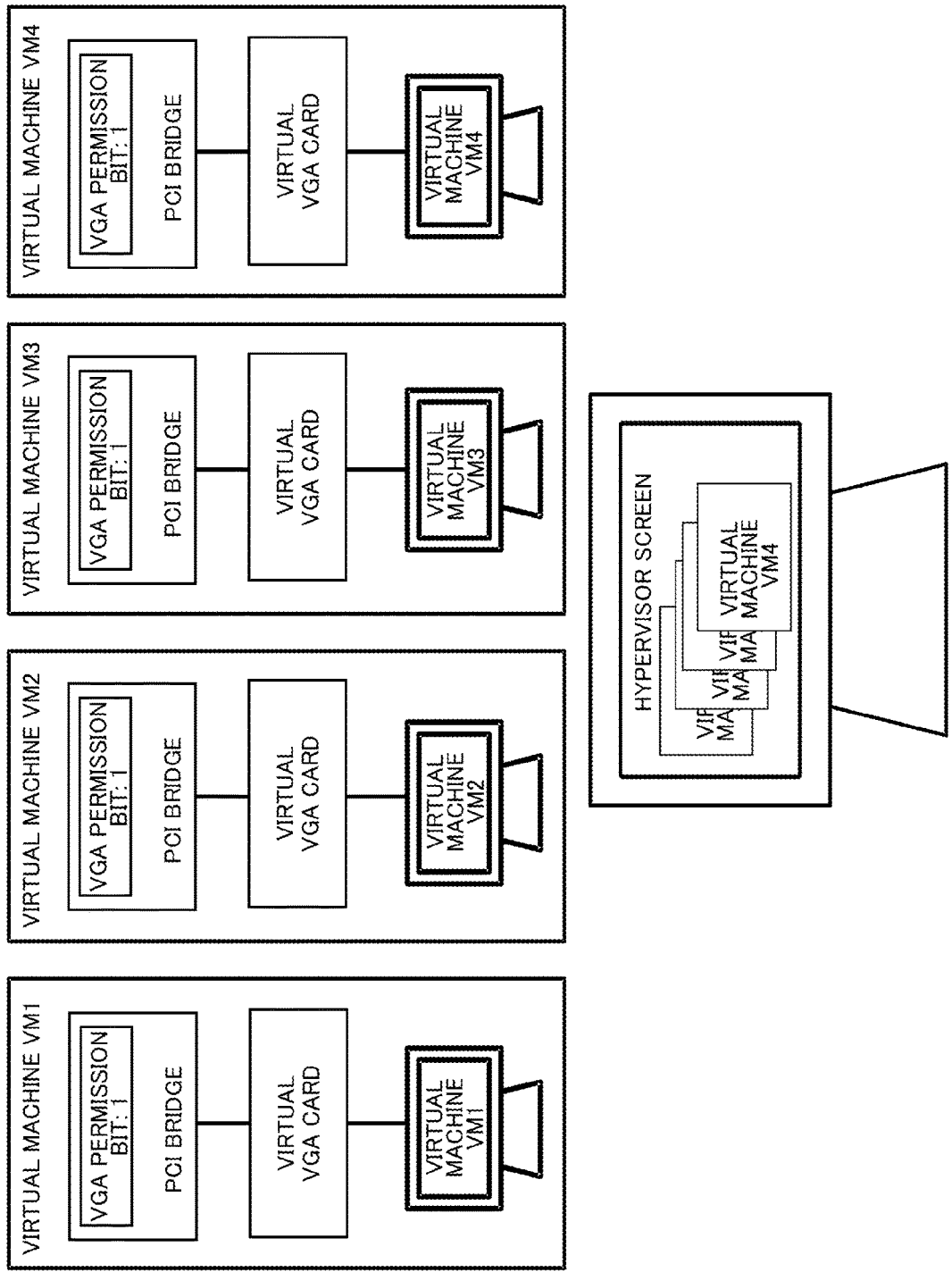

INFORMATION PROCESSING APPARATUS INCLUDING BRIDGES THAT CONNECT VIRTUAL MACHINES AND PHYSICAL DEVICES, AND CONTROL METHOD THEREOF

CROSS-REFERENCE TO RELATED APPLICATION

This application is a continuation application of International Application PCT/JP2012/063039 filed on May 22, 2012 and designated the U.S., the entire contents of which are incorporated herein by reference.

FIELD

The present invention relates to an information processing apparatus, a control method, and a computer-readable recording medium having stored therein a control program.

BACKGROUND

Generally, in a computer system, a hypervisor is started and a plurality of virtual machines are started by the hypervisor. Each virtual machine allocates an actual device, a virtual device, or the like, and operates while accessing the actual device, the virtual device, or the like by operating an application on an operating system (OS).

As the actual device allocated to the virtual machine, there is a peripheral components interconnect (PCI) device. An input/output (I/O) address assigned to a general PCI device is variable. Therefore, in a case where a plurality of PCI devices are mounted on a system, address collision is avoided by assigning different I/O addresses to the respective PCI devices and it is possible to simultaneously handle a plurality of PCI devices by a plurality of virtual machines.

However, in a video device (hereinafter, referred to as a video graphic array (VGA)), an I/O address assigned to the VGA is fixed as opposed to a general PCI device. A device, such as a VGA whose I/O address is fixed, is referred to as a legacy device. Generally, an I/O address assigned to a VGA is fixed on the assumption that only one display is provided in one computer system (for example, a personal computer).

Also, a general PCI device is accessed by a memory mapped I/O (MMIO) method or an I/O address method. In the case of the VGA, an MMIO address (non-fixed) for setting of a frame buffer or VGA is assigned. Furthermore, in the case of the VGA, I/O addresses (for example, 3B0h to 3BBh, 3C0h to 3DFh) for I/O access upon system start-up or the like and memory addresses (for example, 000A0000h to 000BFFFFh) prepared for a frame buffer of image display of the VGA are fixedly assigned.

The virtual machine performs an I/O access to the VGA by using I/O addresses upon start-up. In a case where a plurality of actual VGAs are mounted on one computer system and the separate actual VGAs are allocated to a plurality of virtual machines, it is desired to assign unique I/O addresses to the respective actual VGAs. At this time, I/O addresses assigned to the VGAs are the same fixed value as described above. Even when the I/O addresses are the fixed value, I/O spaces on the respective virtual machines are separate, and therefore, the same fixed I/O address can be assigned to the respective VGAs.

However, since the hypervisor handles the I/O addresses of the plurality of VGAs, which are used by the plurality of respective virtual machines, within one I/O space, address duplication or collision occurs if the same fixed I/O address is assigned to the plurality of VGAs (see FIG. 13). FIG. 13 illustrates a state in which each of two virtual machines VM1 and VM2 requests a legacy access to two different VGAs (VGA cards #1 and #2) to which the same I/O address (for example, 3B0h to 3BBh, 3C0h to 3DFh) is assigned. Therefore, the plurality of VGAs can be simultaneously used on one computer system.

Therefore, in a case where a plurality of VGAs are mounted, only one of the plurality of VGAs is set to be enabled and the remaining VGAs are set to be disabled. The enable/disable switching of the respective VGAs is performed by using a VGA permission bit of a PCI bridge (see FIG. 14). In FIG. 14, one central processing unit (CPU) constituting four virtual machines VM1 to VM4 is connected to four VGA cards #1 to #4 through a chipset and four PCI bridges. For example, in order to enable only the VGA card #2 allocated to the virtual machine VM2, "1" is set to the VGA permission bit of the PCI bridge that connects the virtual machine VM2 and the VGA card #2, and "0" is set to the VGA permission bits of the remaining PCI bridges.

Therefore, since it is impossible to use only one VGA in one computer system, the virtual machine operated by allocating the actual VGA is suppressed to one. Therefore, the actual VGA, which can be allocated to the virtual machine, is at most one in the whole computer system, and it is impossible to handle a plurality of actual VGAs by a plurality of virtual machines.

As a method for suppressing address duplication or collision, a method illustrated in FIG. 15 is considered. In the method illustrated in FIG. 15, virtual VGA cards are allocated to virtual machines VM1 to VM4, respectively. A hypervisor controls an actual VGA, and screen outputs of the respective virtual machines are displayed on a screen of the hypervisor. In this method, since the virtual VGA cards allocated to the virtual machines VM1 to VM4 are VGAs that are created and virtualized by the hypervisor, abundant functions of the actual VGA cannot be all used.

Patent Literature 1 (JP 2004-252591 A) discloses a technology that controls an access from a virtual machine to a PCI device by using an allocation table of the PCI device and the virtual machine. In the technology, in a case where a plurality of legacy devices (for example, VGAs), to which the same fixed I/O address is assigned, are mounted as PCI devices, collision of I/O addresses cannot be avoided as described above. Therefore, the actual VGAs cannot be simultaneously allocated to the plurality of virtual machines, respectively.

Patent Literature 2 (JP 2009-181418 A) discloses a technology that inhibits an access from an I/O device to a virtual server by setting a register in a PCI switch and inhibits an access from a virtual server to an I/O device by using a hot plug mechanism. In the technology, the I/O device (VGA) is temporarily disconnected from the virtual server (virtual machine) and is then reconnected. Since a resetting is performed at the time of re-connection, a resetting for returning to a state prior to the disconnection of the device is required. In a system that simultaneously handles a plurality of VGAs, the access to the VGAs occurs frequently. Therefore, in the case of using the above technology, processing from the disconnection of the VGA to the resetting occurs frequently and the practical performance cannot be expected.

SUMMARY

According to one aspect, an information processing apparatus includes: a processor that constructs a plurality of virtual machines; a plurality of devices that assign a same I/O address; and a plurality of bridges that connect the processor and the plurality of devices, wherein the processor creates a table that manages identification information of the bridges on respective paths from the processor to the respective devices and passage setting information indicating whether or not to permit passages of the respective paths, and when one access from one virtual machine among the plurality of virtual machines to one device among the plurality of devices allocated to the one virtual machine is detected, the processor refers to the table, sets the passage setting information of the table and a state of the bridge on the path such that the passage of the path from the processor to the one device is permitted, and executes the one access.

According to one aspect, a method for controlling an information processing apparatus, which includes a processor that constructs a plurality of virtual machines, a plurality of devices that assign a same I/O address, and a plurality of bridges that connect the processor and the plurality of devices, includes: creating a table that manages identification information of the bridges on respective paths from the processor to the respective devices and passage setting information indicating whether or not to permit passages of the respective paths; and when one access from one virtual machine among the plurality of virtual machines to one device among the plurality of devices allocated to the one virtual machine is detected, referring to the table, setting the passage setting information of the table and a state of the bridge on the path such that the passage of the path from the processor to the one device is permitted, and executing the one access.

According to one aspect, a program for causing a computer to execute a process for controlling an information processing apparatus, which includes a processor that constructs a plurality of virtual machines, a plurality of devices that assign a same I/O address, and a plurality of bridges that connect the processor and the plurality of devices, includes: creating a table that manages identification information of the bridges on respective paths from the processor to the respective devices and passage setting information indicating whether or not to permit passages of the respective paths; and when one access from one virtual machine among the plurality of virtual machines to one device among the plurality of devices allocated to the one virtual machine is detected, referring to the table, setting the passage setting information of the table and a state of the bridge on the path such that the passage of the path from the processor to the one device is permitted, and executing the one access.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 15 is a block diagram illustrating a second example of a method for suppressing address duplication or collision.

DESCRIPTION OF THE PREFERRED EMBODIMENTS

Hereinafter, embodiments will be described with reference to the drawings.

[1] Configuration of Computer System of Present Embodiment

Figure 1:
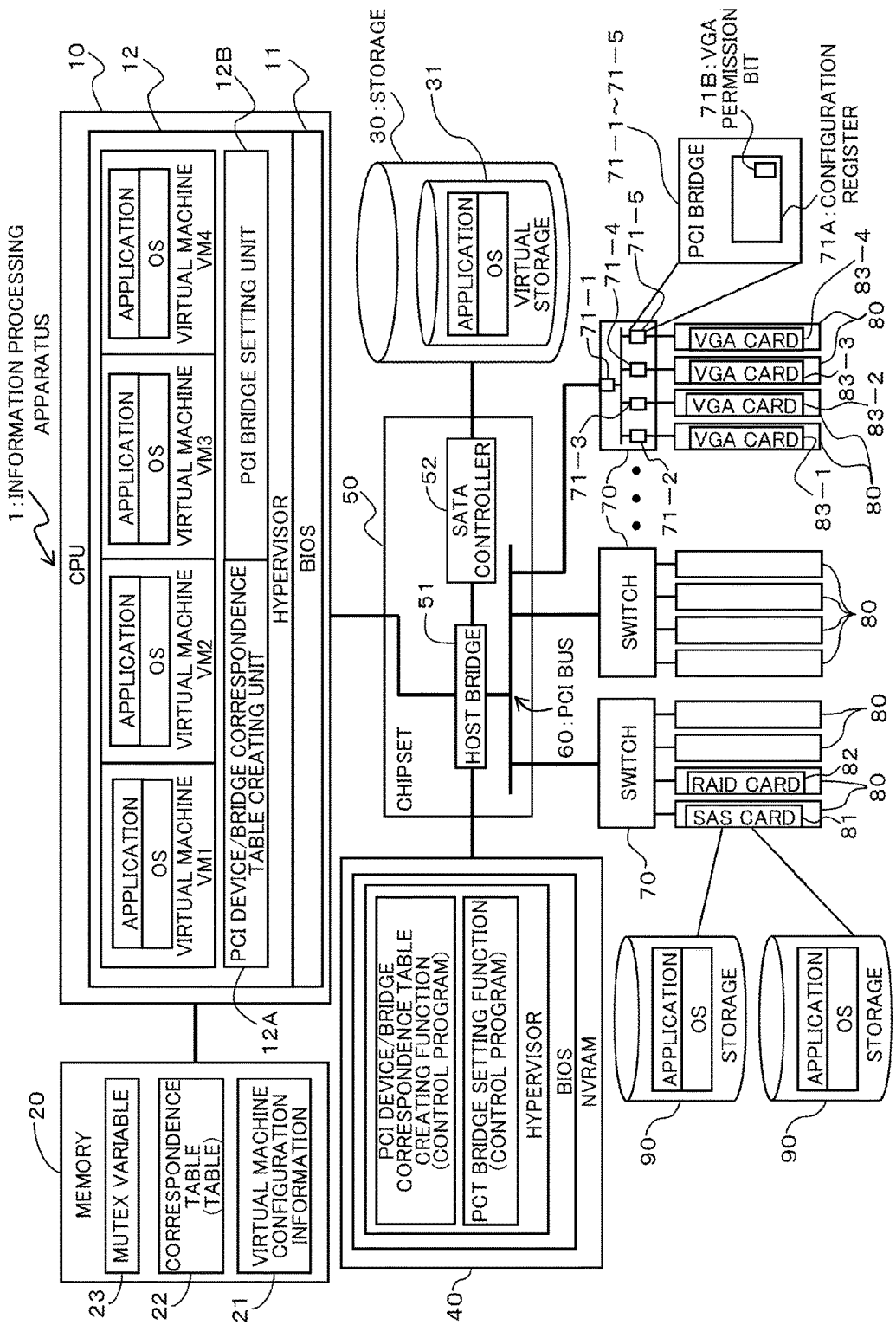
FIG. 1 is a block diagram illustrating a configuration of an information processing apparatus according to an embodiment.

FIG. 1 is a block diagram illustrating a configuration of an information processing apparatus (computer system) 1 according to an embodiment.

The computer system 1 illustrated in FIG. 1 has a general architecture that constructs a plurality of virtual machines VM1 to VM4 (four virtual machines in the drawing). The computer system 1 includes a CPU (processor) 10, a memory 20, a storage 30, a non-volatile random access memory (NVRAM) 40, a chipset 50, a PCI bus 60, a switch 70, a slot 80, and a storage 90.

The NVRAM 40 stores a basic input/output system (BIOS) program that initializes the computer system 1 in the CPU 10. The CPU 10 starts the BIOS 11 by executing the BIOS program. In the BIOS program, a hypervisor program causing the CPU 10 to function as the hypervisor 12 is embedded. Furthermore, the hypervisor program includes a control program causing the CPU 10 to function as a PCI device/bridge correspondence table creating unit 12A and a PCI bridge setting unit 12B, which will be described below.

In the storage 30, a virtual storage 31 including an OS and an application program for the virtual machines VM1 to VM4 is constructed.

The memory 20 loads and stores the BIOS program read from the NVRAM 40 by the CPU 10, or the OS and the application program read from the virtual storage 31 by the virtual machines VM1 to VM4. Also, the memory 20 stores updated virtual machine configuration information 21 created by the hypervisor 12, and stores a PCI device/bridge correspondence table 22 or a mutex variable 23, which will be described below.

The chipset 50 is connected to the CPU 10, the storage 30, and the NVRAM 40 and is connected to a plurality of PCI-Ex (Express) slots (hereinafter, simply referred to as slots) 80 through the PCI bus 60 and the switch 70. The chipset 50 includes a host bridge 51 and a serial advanced technology attachment (SATA) controller 52. The SATA controller 52 controls an access to the storage 30 according to a request from the CPU 10. The host bridge 51 connects the storage 30, the NVRAM 40, and the slot 80 to the CPU 10.

As an extension card (PCI device), an SAS card 81, a redundant arrays of inexpensive disks (RAID) card 82, a VGA card 83, or the like are inserted into the slots 80. By inserting the SAS card 81, the storages 90 can be expanded. The devices 81 to 83 inserted into the slots 80 are connected to the host bridge 51 through a PCI bridge (hereinafter, simply referred to as a bridge) 71 embedded in the switch 70 that mutually connects the PCI bus 60.

In the computer system 1, a plurality of switches 70 are provided. Four slots 80 are connected to each of the switches 70 illustrated in FIG. 1. The SAS card 81 and the RAID card 82 are respectively inserted into two slots among the four slots 80 connected to the switch 70 on the left side of FIG. 1, and two storages 90 are connected to the SAS card 81 and expanded. VGA cards (video devices) 83-1 to 83-4 are respectively inserted into the four slots 80 connected to the switch 70 on the right side of FIG. 1. The VGA cards 83-1 to 83-4 are legacy devices, and the same I/O address is fixedly assigned to the VGA cards 83-1 to 83-4 as described above. Hereinafter, as reference signs indicating the VGA cards, reference signs 83-1 to 83-4 are used when one of the plurality of VGA cards is specified, and reference sign 83 is used when arbitrary VGA cards are indicated. Also, the VGA cards 83-1 to 83-4 may be referred to as VGA cards #1 to #4, respectively. The VGA cards #1 to #4 indicate identification information (ID) for identifying the four VGA cards 83 (see FIG. 2).

Each of the switches 70 includes five bridges 71-1 to 71-5. The host bridge 51 is connected to one end of the bridge 71-1 through the PCI bus 60 (bus #0; see FIG. 3). One ends of the four bridges 71-2 to 71-5 are connected to the other end of the bridge 71-1 through the PCI bus 60 (bus #1; see FIG. 3). The slots 80 are respectively connected to the other ends of the four bridges 71-2 to 71-5 through the PCI bus 60 (buses #2 to #5; see FIG. 3). The VGA cards 83-1 to 83-4 are respectively inserted into the slots 80 connected to the four bridges 71-2 to 71-5 of the switch 70 on the right side of FIG. 1. Hereinafter, as reference signs indicating the bridges, reference signs 71-1 to 71-5 are used when one of the plurality of bridges is specified, and reference sign 71 is used when arbitrary bridges are indicated. Also, the bridges 71-1 to 71-5 may be referred to as PCI bridges #1 to #5, respectively. The PCI bridges #1 to #5 indicate identification information (ID) for identifying the five bridges 71 (see FIG. 2). The buses #0 to #5 indicate bus numbers for specifying the PCI buses 60.

In each of the bridges 71, a configuration register (bridge control register) 71A for setting a state of the bridge 71 is provided. A VGA permission bit 71B is included in the configuration register 71A. Passage permission information (0 or 1) indicating whether or not to pass a signal through the bridge 71 is set to the VGA permission bit 71B by the hypervisor 12. In a case where the passage of the signal is permitted, for example, "1" is set to the VGA permission bit 71B. On the other hand, in a case where the passage of the signal is denied, for example, "0" is set to the VGA permission bit 71B.

The I/O address fixedly assigned to the VGA card 83 and the request for access (legacy access) to the memory address of the frame buffer are transmitted to the VGA card 83 through the bridge 71 in which "1" is set to the VGA permission bit 71B. On the other hand, nothing is transmitted to the VGA card 83 connected to the bridge 71 in which "0" is set to the VGA permission bit 71B. For example, in a configuration illustrated in FIG. 3, which will be described below, "1" is set to the VGA permission bits 71B of the bridges #1 and #2, and "0" is set to the VGA permission bits 71B of the bridges #3 to #5. Therefore, the I/O address and the access request are transmitted to only the VGA card #1 and are not transmitted to the VGA cards #2 to #4.

After the start-up of the computer system 1, the CPU 10 functions as the PCI device/bridge correspondence table creating unit 12A and the PCI bridge setting unit 12B by executing the control program included in the hypervisor program read from the NVRAM 40.

The PCI device/bridge correspondence table creating unit 12A is called during the initializing process of the hypervisor 12 at the time of the start-up of the computer system and performs a process of creating/initializing the correspondence table 22 for all VGA cards 83. The process of creating the correspondence table 22 by the PCI device/bridge correspondence table creating unit 12A will be described in detail with reference to FIGS. 7 and 8.

Figure 2:
FIG. 2 is a diagram illustrating an example of a PCI device/bridge correspondence table of the present embodiment.
Figure 3:
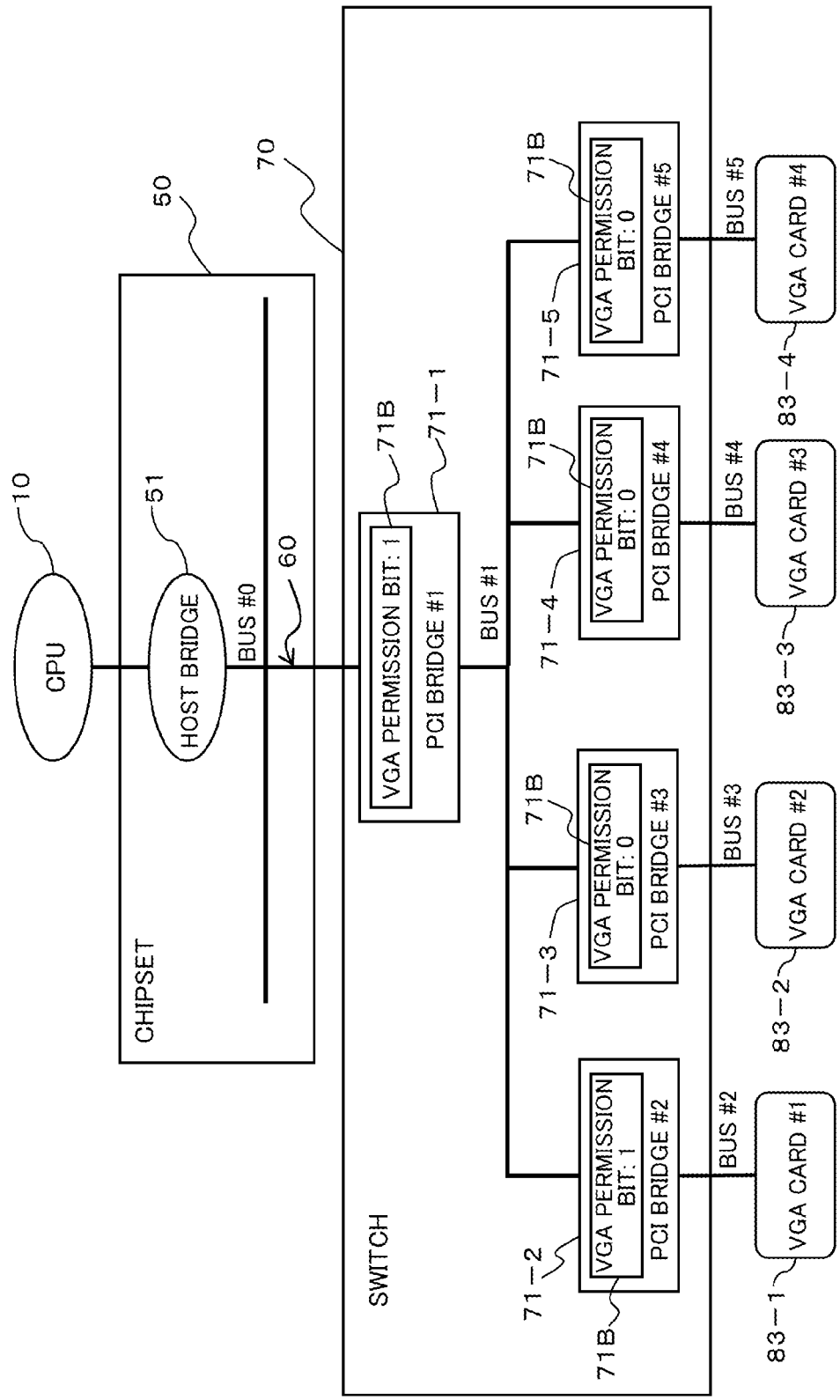
FIG. 3 is a block diagram illustrating states of VGA permission bits in the same configuration as the configuration corresponding to the example of the correspondence table illustrated in FIG. 2.

As illustrated in FIG. 2, the PCI device/bridge correspondence table 22 manages identification information (ID; bridges #1 to #5) of the bridges 71 on respective paths from the CPU 10 to the respective VGA cards 83, and the passage setting information (permission bit) indicating whether or not to permit the passages of the respective paths, with respect to each of the VGA cards 83. FIG. 2 is a diagram illustrating an example of the PCI device/bridge correspondence table 22. FIG. 3 is a block diagram illustrating the states of the VGA permission bits 71B in the same configuration as the configuration corresponding to the example of the correspondence table 22 illustrated in FIG. 2.

More specifically, as illustrated in FIG. 2, the correspondence table 22 is created for each VGA card 83 row by row. A PCI device ID specifying the VGA card 83, an ID of the PCI bridge 71 to which the VGA card 83 is connected, and a permission bit indicating whether or not to permit the passage of the path connecting the PCI bridge 71 are set to each row of the correspondence table 22. For example, in the case of the configuration/state illustrated in FIG. 3, the PCI bridges #1 and #2 on the path between the CPU 10 and the VGA card 83-1 are registered at the row of the VGA card #1, and "1" indicating the permission of the passage of the corresponding path is set to the permission bit. The PCI bridges #1 and #3 on the path between the CPU 10 and the VGA card 83-2 are registered at the row of the VGA card #2, and "0" indicating the denial of the passage of the corresponding path is set to the permission bit. The PCI bridges #1 and #4 on the path between the CPU 10 and the VGA card 83-3 are registered at the row of the VGA card #3, and "0" indicating the denial of the passage of the corresponding path is set to the permission bit. The PCI bridges #1 and #5 on the path between the CPU 10 and the VGA card 83-4 are registered at the row of the VGA card #4, and "0" indicating the denial of the passage of the corresponding path is set to the permission bit. That is, in the example illustrated in FIGS. 2 and 3, only the path connecting the CPU 10 (virtual machine VM1) and the VGA card #1 among the paths connecting the CPU 10 (four virtual machines VM1 to VM4) and the VGA cards #1 to #4 is set to an enabled state, that is, a signal passable state.

When the PCI bridge setting unit 12B detects the access to the VGA card 83 assigned to the virtual machine from one of the virtual machines VM1 to VM4, the PCI bridge setting unit 12B refers to the correspondence table 22 and performs the following setting process, based on the virtual machine having performed the corresponding access. That is, the PCI bridge setting unit 12B sets the permission bit of the correspondence table 22 and the state of the bridge 71 (state of the VGA permission bit 72B), such that the passage of the path from the CPU 10 to the VGA card 83 allocated to the virtual machine having performed the corresponding access is permitted. Also, in the present embodiment, the actual VGA cards 83-1 to 83-4, which are legacy devices, are allocated to the virtual machines VM1 to VM4, respectively.

In a case where "0" is set to the permission bit of the VGA card 83 to be accessed in the correspondence table 22, that is, in a case where a state of denying the passage of the path from the CPU 10 to the VGA card 83 to be accessed is set, the PCI bridge setting unit 12B performs the following setting process. That is, the PCI bridge setting unit 12B sets the permission bit of remaining paths other than the corresponding path and states of the bridges 71 on the remaining paths to a state of denying the passage, and sets the permission bit of the corresponding path and the state of the bridge 71 on the corresponding path to a state of permitting the passage.

For example, in the state illustrated in FIGS. 2 and 3, in a case where the virtual machine VM2 accesses the VGA card #2 assigned thereto, "0" is set to the permission bit of the VGA card #2 in the correspondence table 22. First, the PCI bridge setting unit 12B recognizes the row of the VGA card #1 in which "1" is set to the permission bit in the correspondence table 22, acquires the bridges #1 and #2 registered in the corresponding rows as release object bridges, and sets the VGA permission bits 71B of the release object bridges #1 and #2 to "0". Also, the PCI bridge setting unit 12B sets the permission bit to "0" at the row of the VGA card #1 of the correspondence table 22. At this time, the VGA permission bits 71B of the bridges #1 to #5 are all set to "0". Thereafter, the PCI bridge setting unit 12B sets the VGA permission bits 71B of the setting object bridges #1 and #3 to "1", wherein the setting object bridges #1 and #3 are on the path reaching the VGA card #2, and sets the permission bit to "1" at the row of the VGA card #2 of the correspondence table 22. Therefore, the remaining paths other than the path reaching the VGA card #2 (bridge #1→#3) is set to a state of denying the signal passage. The path reaching the VGA card #2 (bridge #1→#3) is set to a state of permitting the signal passage. An access from the virtual machine VM2 to the VGA card #2 to be accessed is performed. The details of the above-described process will be described with reference to FIGS. 2, 3 and 10.

In a case where "1" is set to the permission bit of the VGA card 83 to be accessed in the correspondence table 22, that is, in a case where a state of permitting the passage of the path from the CPU 10 to the VGA card 83 to be accessed is set, the PCI bridge setting unit 12B performs the following process. That is, the PCI bridge setting unit 12B performs the access from the virtual machine to the VGA card 83 to be accessed, without updating the permission bit of the correspondence table 22 or the VGA permission bits 71B of the respective bridges 71.

For example, in the state illustrated in FIGS. 2 and 3, when the virtual machine VM1 accesses the VGA card #1 assigned thereto, "1" is set to the permission bit of the VGA card #1 in the correspondence table 22. Therefore, the PCI bridge setting unit 12B having trapped the corresponding address performs the access from the virtual machine VM1 to the VGA card #1 to be accessed, without updating the permission bit of the correspondence table 22 or the VGA permission bits 71B of the respective bridges 71.

In a case where an access from an other virtual machine to an other VGA card 83 is detected between the detection of the access from the virtual machine to the VGA card 83 to the completion of the execution of the same access, the PCI bridge setting unit 12B makes the process of the other access wait until the execution of the preceding access is completed. The waiting process by the PCI bridge setting unit 12B is performed by using a mutex (MUTual EXclusion) variable 23 of the memory 20. When an access from one virtual machine to the VGA card 83 is detected, the PCI bridge setting unit 12B acquires a lock by setting the mutex variable 23 to "1". The PCI bridge setting unit 12B releases the lock by setting the mutex variable 23 to "0" according to the completion of the corresponding access. Therefore, the PCI bridge setting unit 12B exclusively uses the correspondence table 22, upon the access from the virtual machines VM1 to VM4 to the VGA card 83, by making a subsequent access wait while the mutex variable 23 is set to "1".

The setting process by the PCI bridge setting unit 12B will be described in detail with reference to FIGS. 9 to 11.

Also, in a case where the virtual machines VM1 to VM4 refer to the states (the values of the VGA permission bits 71B) of the bridges 71 connected to the VGA cards #1 to #4 assigned thereto, the CPU 10 (hypervisor 12) performs the following function. That is, when a request for reference to the state of the bridge 71 is received from one of the virtual machines VM1 to VM4, the hypervisor 12 functions to return "1" indicating the state of permitting the signal passage or a preset state to the virtual machines VM1 to VM4, regardless of the state of the bridge 71. The relevant function will be described below with reference to FIG. 12.

[2] Flow of Processing by Computer System of Present Embodiment

Hereinafter, the operation of the computer system 1 of the present embodiment will be described in more detail with reference to FIGS. 4 to 12.

First, the flow of the process by the computer system 1 of the present embodiment will be described with reference to a flowchart illustrated in FIG. 4 (steps S10 to S20).

When the computer system 1 is started, the CPU 10 starts the BIOS 11 by reading the BIOS program in which the hypervisor program is embedded from the NVRAM 40, loading the BIOS program on the memory 20, and executing the BIOS program (step S10). The BIOS 11 executes an initializing process of the computer system 1, the initializing process including a PCI bus scan process (step S11), and then starts the hypervisor 12 (step S12). The PCI bus scan process by the BIOS 11 will be described below with reference to FIGS. 5 and 6.

When started, the hypervisor 12 calls the function as the PCI device/bridge correspondence table creating unit 12A and creates the PCI device/bridge correspondence table 22 on the memory 20 (step S13). The process of creating the correspondence table 22 by the PCI device/bridge correspondence table creating unit 12A will be described with reference to FIGS. 7 and 8.

After creating the correspondence table 22, the hypervisor 12 performs the construction or configuration modification of the virtual machines VM1 to VM4, creates virtual machine configuration information 21, and stores the virtual machine configuration information 21 in the memory 20 (step S14). The hypervisor 12 allocate actual devices or virtual devices to the virtual machines VM1 to VM4, based on the virtual machine configuration information 21, performs an access control, and starts the virtual machines VM1 to VM4 (step S15). The virtual machines VM1 to VM4 reads an OS from the storage 30 (virtual storage 31) allocated thereto, loads the OS on the memory 20, starts the OS, and operates the application on the OS. Also, as described above, in the present embodiment, the actual VGA cards 83-1 to 83-4, which are legacy devices, are allocated to the virtual machines VM1 to VM4, respectively.

After the start of the virtual machines VM1 to VM4, when the respective virtual machines issue a request for legacy access (request for I/O access) to the VGA cards 83 allocated thereto (step S16), the hypervisor 12 detects and traps the request for legacy access (step S17). When the hypervisor 12 traps the request for legacy access, the hypervisor 12 calls the function as the PCI bridge setting unit 12B and sets the correspondence table 22 or the state of the PCI bridge 71 according to the object VGA card 83 of the request for legacy access and the correspondence table 22. After the setting of the state, the hypervisor 12 executes the request for legacy access to the object VGA card 83 (step S18). Thereafter, the virtual machine having executed the request for access to the VGA card 83 obtains the access result from the hypervisor 12 (step S19), and proceeds to other process (step S20). The setting process by the PCI bridge setting unit 12B will be described with reference to FIGS. 9 to 11.

[3] PCI Bus Scan Process by BIOS

The PCI bus scan process by the BIOS 11 will be described with reference to a flowchart illustrated in FIG. 5 (steps S21 to S26). The PCI bus scan process is a process that is performed in step S11 of FIG. 4. Herein, the PCI devices including the VGA cards 83 can be identified by bus numbers (bus #0 to #5), device numbers (VGA cards #1 to #4), and function numbers.

The BIOS 11 attempts to access the devices sequentially from the bus #0 connected to the host bridge 51 by combining all the device numbers and the function functions on the PCI buses 60 (steps S21 to S25). In a case where the bridge is found on the bus that is being scanned (YES route of step S22), the BIOS 11 recursively performed the bus scan downstream of the found bridge (step S23). In a case where the device accessed by the bus scan is not the bridge (NO route of step S22), the BIOS 11 performs a PCI resource setting process on the corresponding device (step S24). When the device access is performed on all the combinations (steps S21 to S25), the BIOS 11 performs a PCI resource setting process on the bridge (step S26) and ends the PCI bus scan process. In the PCI bus scan process, the CPU 10 can enumerate all the PCI devices on the computer system 1 and access the PCI devices.

Figure 5:
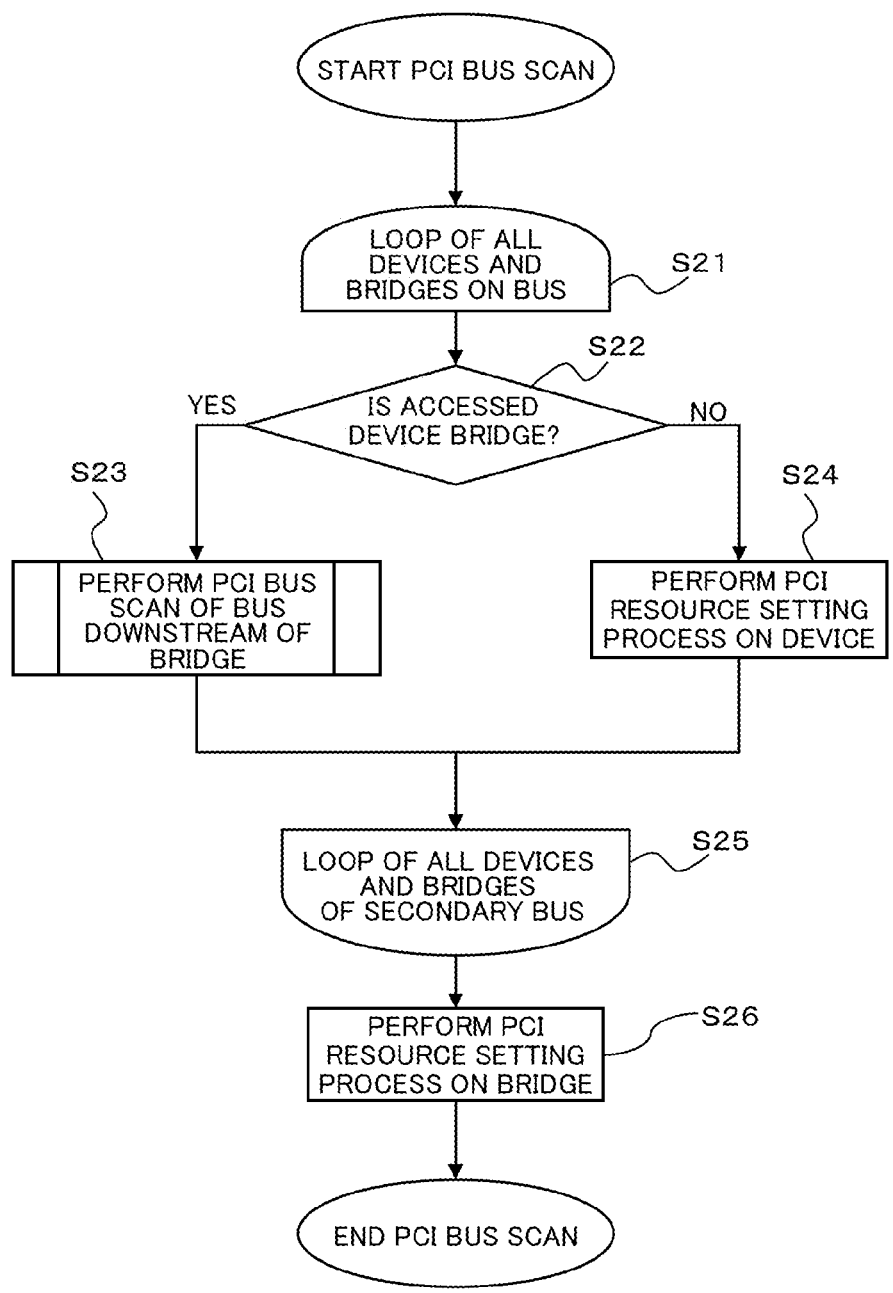
FIG. 5 is a flowchart describing a PCI bus scan process by the information processing apparatus illustrated in FIG. 1.
Figure 6:
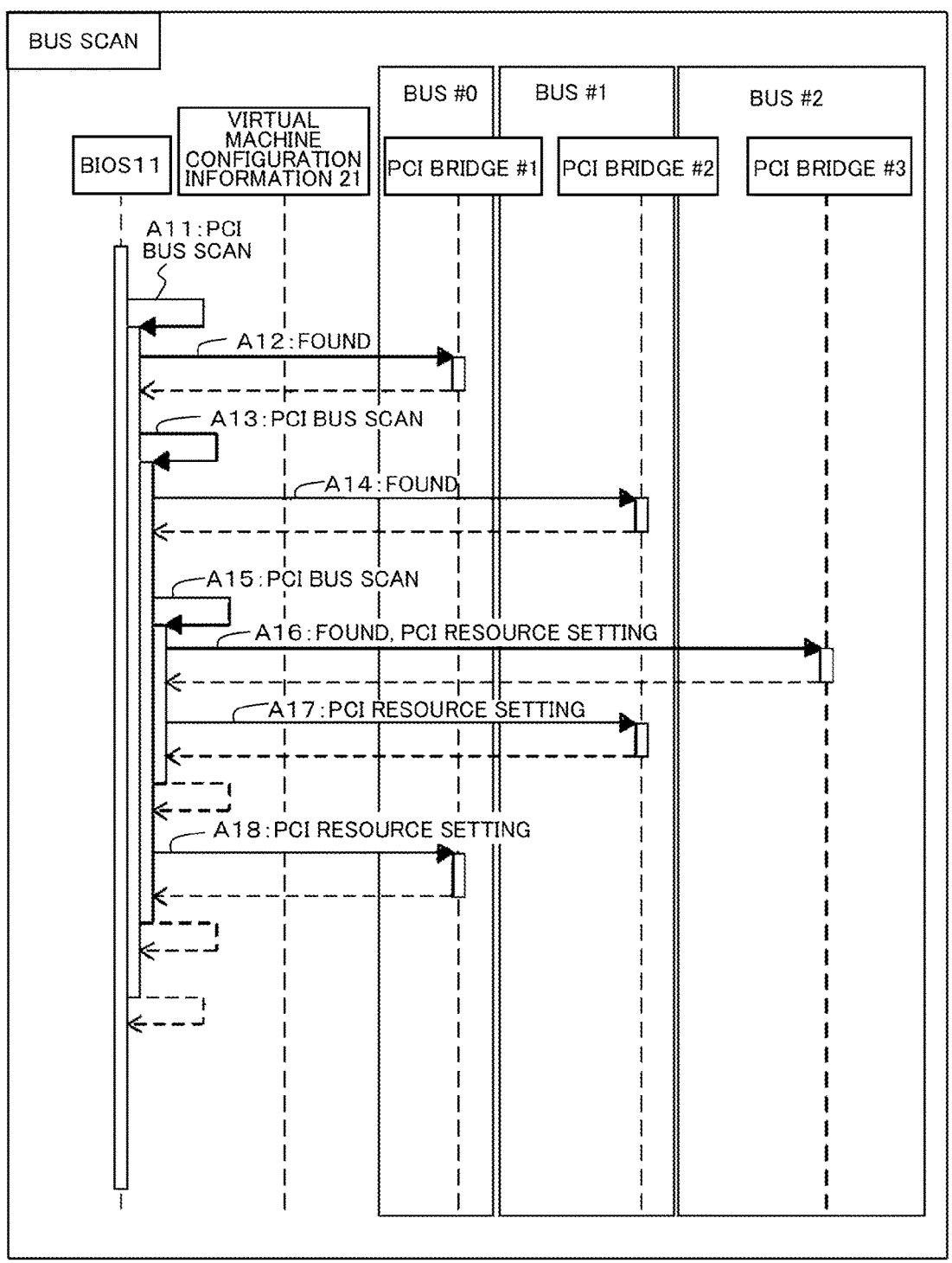
FIG. 6 is a detailed sequence diagram describing a PCI bus scan process by the information processing apparatus illustrated in FIG. 1.

Next, the PCI bus scan process by the BIOS 11 will be described in detail with reference to a sequence diagram illustrated in FIG. 6 (arrows A11 to A18). FIG. 6 illustrates a detailed operation when the PCI bus scan process is performed on the buses #0 to #2 illustrated in FIG. 3, according to the flowchart illustrated in FIG. 5.

When the PCI bus scan is performed on the bus #0 (see the arrow A11), the BIOS 11 finds the PCI bridge #1 (see the arrow A12) and performs the PCI bus scan on the bus #1 more downstream than the PCI bridge #1 (see the arrow A13). The BIOS 11 finds the PCI bridge #2 by performing the PCI bus scan on the bus #1 (see the arrow A14) and performs the PCI bus scan on the bus #2 more downstream than the PCI bridge #2 (see the arrow A15). The BIOS 11 finds the VGA card #1 by performing the PCI bus scan on the bus #2, and performs the PCI resource setting process on the corresponding VGA card #1 (see the arrow A16). Thereafter, the BIOS 11 performs the PCI resource setting process on the PCI bridges #2 and #1 (see the arrows A17 and A18).

[4] PCI Device/Bridge Correspondence Table Creating Process

Figure 7:
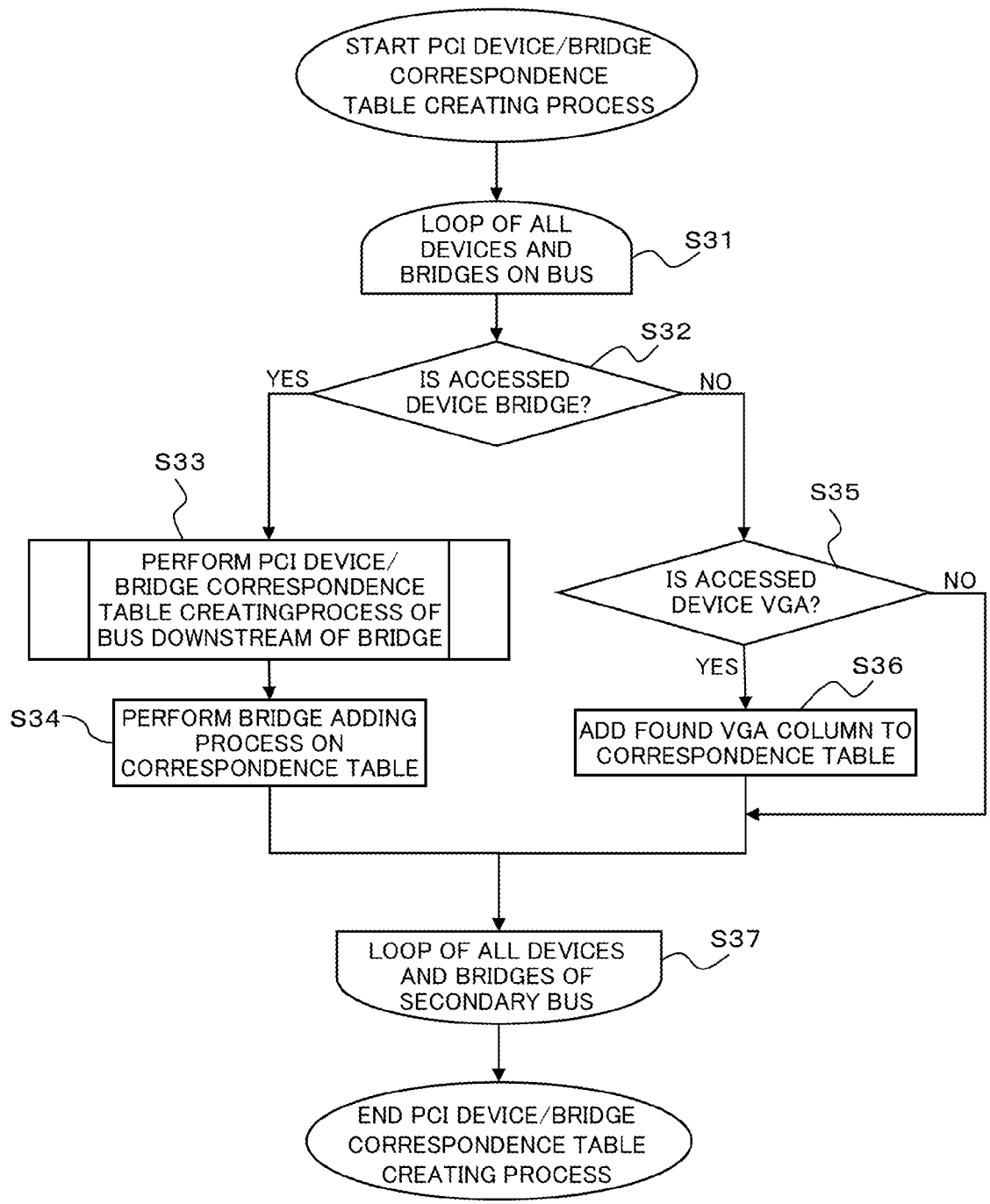
FIG. 7 is a flowchart describing a PCI device/bridge correspondence table creating process by the information processing apparatus illustrated in FIG. 1.

The PCI device/bridge correspondence table creating process by the PCI device/bridge correspondence table creating unit 12A will be described with reference to a flowchart illustrated in FIG. 7 (steps S31 to S37). The correspondence table creating process is a process that is performed in step S13 of FIG. 4.

As described below, the PCI device/bridge correspondence table creating unit 12A creates the correspondence table 22 by performing the same PCI bus scan as the PCI bus scan by the BIOS 11. That is, the correspondence table creating unit 12A attempts to access the devices sequentially from the bus #0 connected to the host bridge 51 by combining all the device numbers and the function functions on the PCI buses 60 (steps S31 to S37). In a case where the bridge is found on the bus that is being scanned (YES route of step S32), the correspondence table creating unit 12A recursively performs the correspondence table creating process downstream of the found bridge (step S33).

In a case where the device accessed by the bus scan is not the bridge (NO route of step S32), the correspondence table creating unit 12A determines whether or not the correspondence device is a VGA card (step S35). In a case where the corresponding device is not the VGA card (NO route of step S35), the correspondence table creating unit 12A proceeds to a next bus scan process. In a case where the corresponding device is the VGA card (YES route of step S35), the correspondence table creating unit 12A adds a row of the VGA card to the correspondence table 22 (step S36). As illustrated in FIG. 2, identification information of the PCI bridge existing until arrival at the corresponding VGA card and the value of the permission bit in the path until arrival at the corresponding VGA card (the default value is, for example, 0) are registered in the row added to the correspondence table 22 in association with the identification information of the corresponding VGA card.

At a stage where a bus scan on a certain bus is finished, that is, at a time point when step S33 recursively performed is finished, in a case where the bridge is connected to the corresponding bus and the VGA card is connected to the downstream of the corresponding bridge, the correspondence table creating unit 12A performs a process of adding the bridge to the correspondence table 22 (step S34). That is, the correspondence table creating unit 12A adds identification information of an upper-level bridge to an item of the corresponding bridge in the correspondence table 22. Therefore, by performing the adding process of step S34 whenever the recursive process is ended, the PCI device/bridge correspondence table 22, in which information on all the bridges 71 existing on the paths from the host bridge 51 to the respective VGA cards 83 is recorded one row, is completed.

Figure 8:
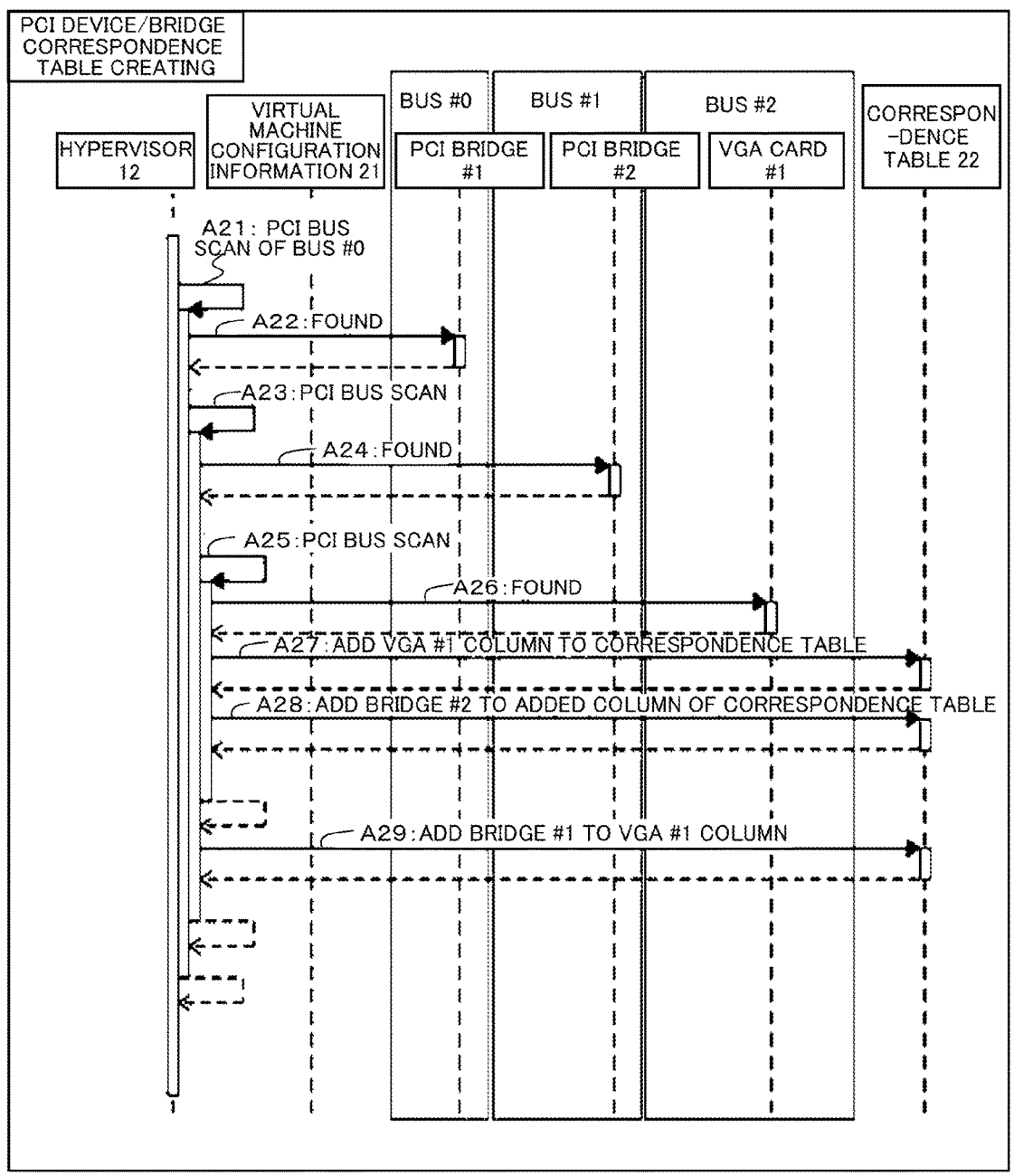
FIG. 8 is a detailed sequence diagram describing a PCI device/bridge correspondence table creating process by the information processing apparatus illustrated in FIG. 1.

Next, the process of creating the PCI device/bridge correspondence table by the correspondence table creating unit 12A will be described in more detail with reference to a sequence diagram illustrated in FIG. 8 (arrows A21 to A29). FIG. 8 illustrates a detailed operation when the row of the VGA card #1 illustrated in FIG. 3 is created and registered in the correspondence table 22, according to the flowchart illustrated in FIG. 7.

When the PCI bus scan is performed on the bus #0 (see the arrow A21), the correspondence table creating unit 12A finds the PCI bridge #1 (see the arrow A22) and performs the PCI bus scan on the bus #1 more downstream than the PCI bridge #1 (see the arrow A23). The correspondence table creating unit 12A finds the PCI bridge #2 by performing the PCI bus scan on the bus #1 (see the arrow A24) and performs the PCI bus scan on the bus #2 more downstream than the PCI bridge #2 (see the arrow A25). The correspondence table creating unit 12A finds the VGA card #1 by performing the PCI bus scan on the bus #2 (see the arrow A26), adds the row of the VGA card #1 to the correspondence table 22 (see the arrow A27), and adds the PCI bridges #2 and #1 to the corresponding row (see the arrows A28 and A29).

[5] PCI Bridge Setting Process

The PCI bridge setting process by the PCI bridge setting unit 12B will be described with reference to a flowchart illustrated in FIG. 9 (steps S41 to S52) and a sequence diagram illustrated in FIG. 10 (arrows A31 to A43). The PCI bridge setting process is a process that is performed in step S18 of FIG. 4.

[5-1] I/O Access from Virtual Machine to VGA Card

Figure 4:
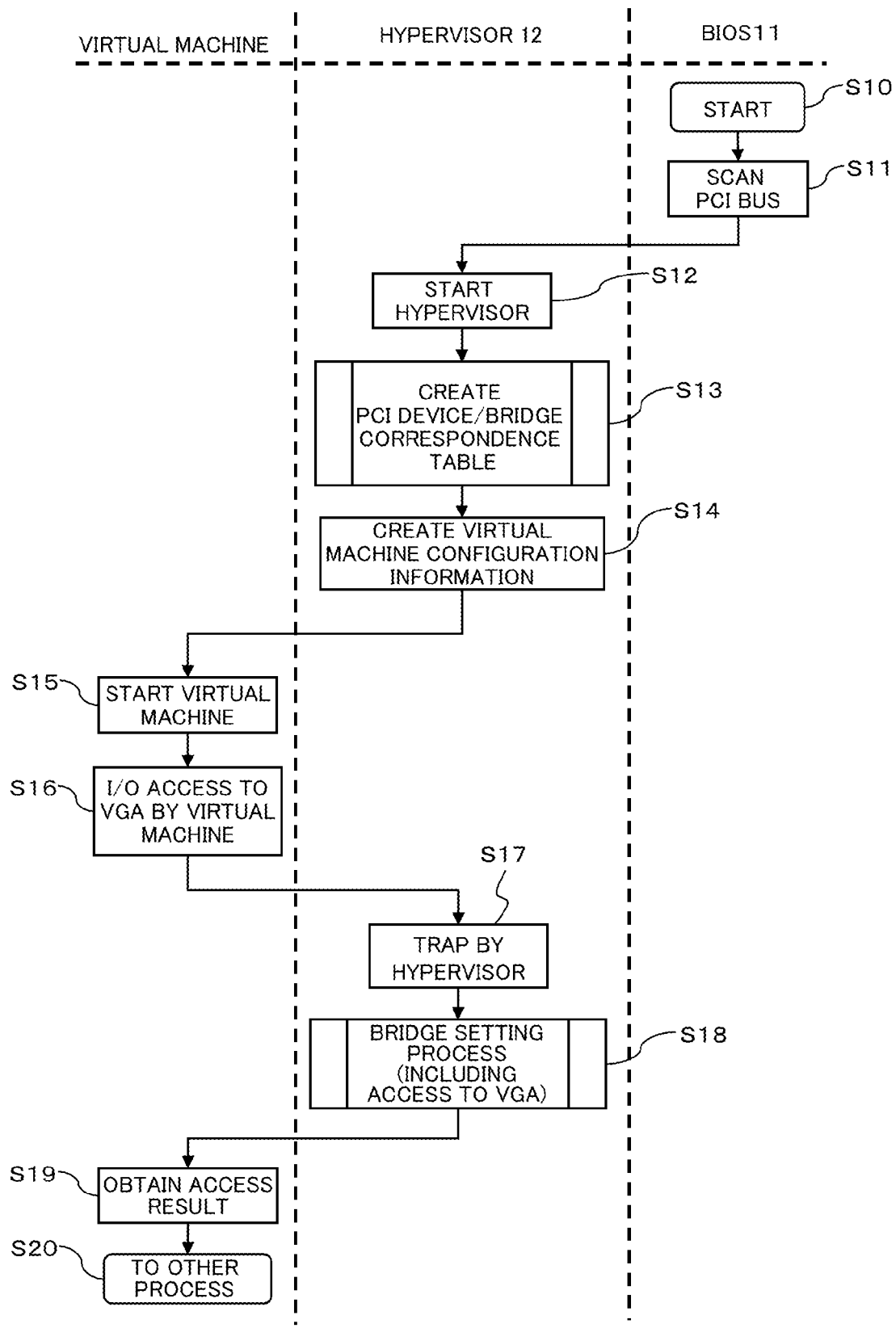
FIG. 4 is a flowchart describing a process by the information processing apparatus illustrated in FIG. 1.

When one of the virtual machines VM1 to VM4 issues a request for I/O access to the VGA card 83 allocated to the corresponding virtual machine, the request for I/O access is trapped by the hypervisor 12 (step S17 of FIG. 4). When the request for I/O access is trapped, the hypervisor 12 refers to the virtual machine configuration information 21 of the memory 20 and acquires the ID of the VGA card 83 allocated to the virtual machine being the issue source of the trapped request for I/O access (step S41 of FIG. 9; see the arrow A31 of FIG. 10). Thereafter, the PCI bridge setting unit 12B is called and started by the hypervisor 12 (see the arrow A32 of FIG. 10).

Figure 9:
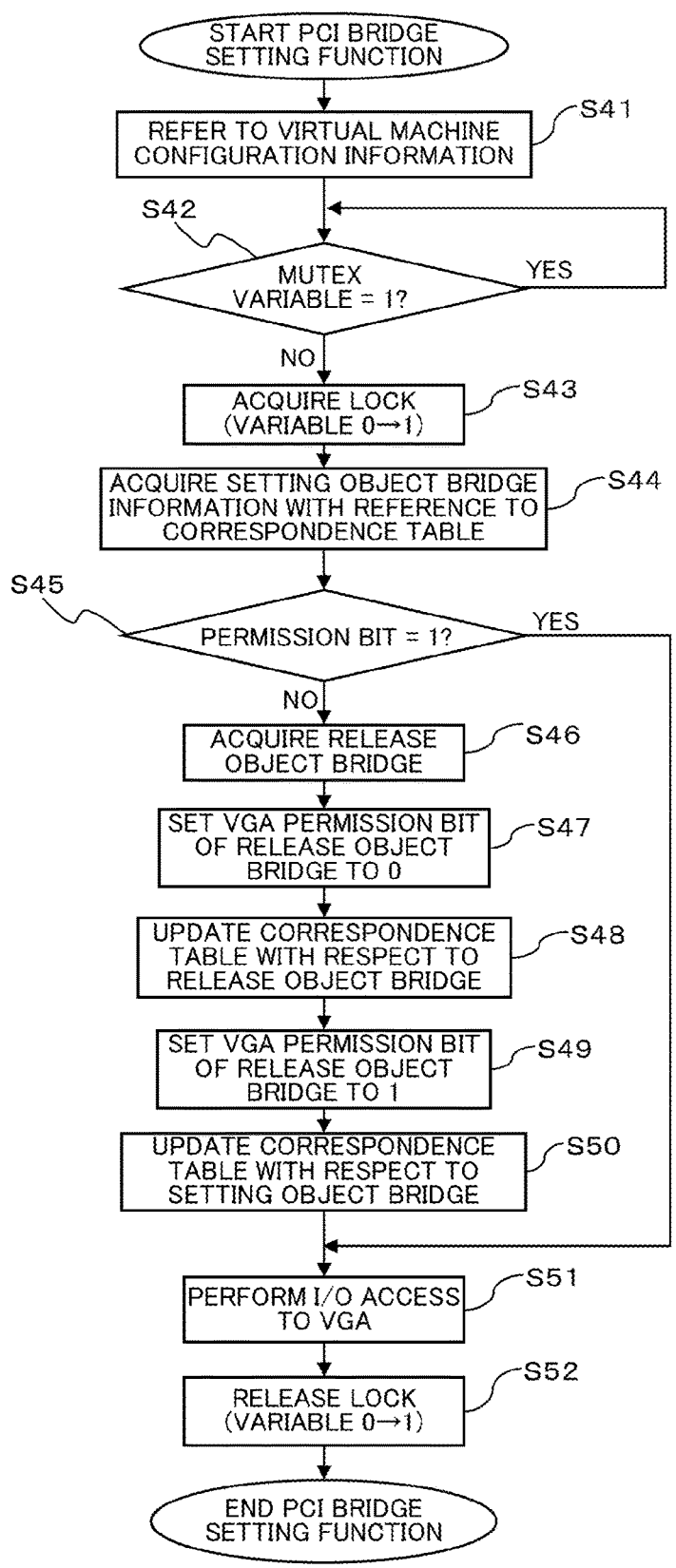
FIG. 9 is a flowchart describing a PCI bridge setting process by the information processing apparatus illustrated in FIG. 1.
Figure 10:
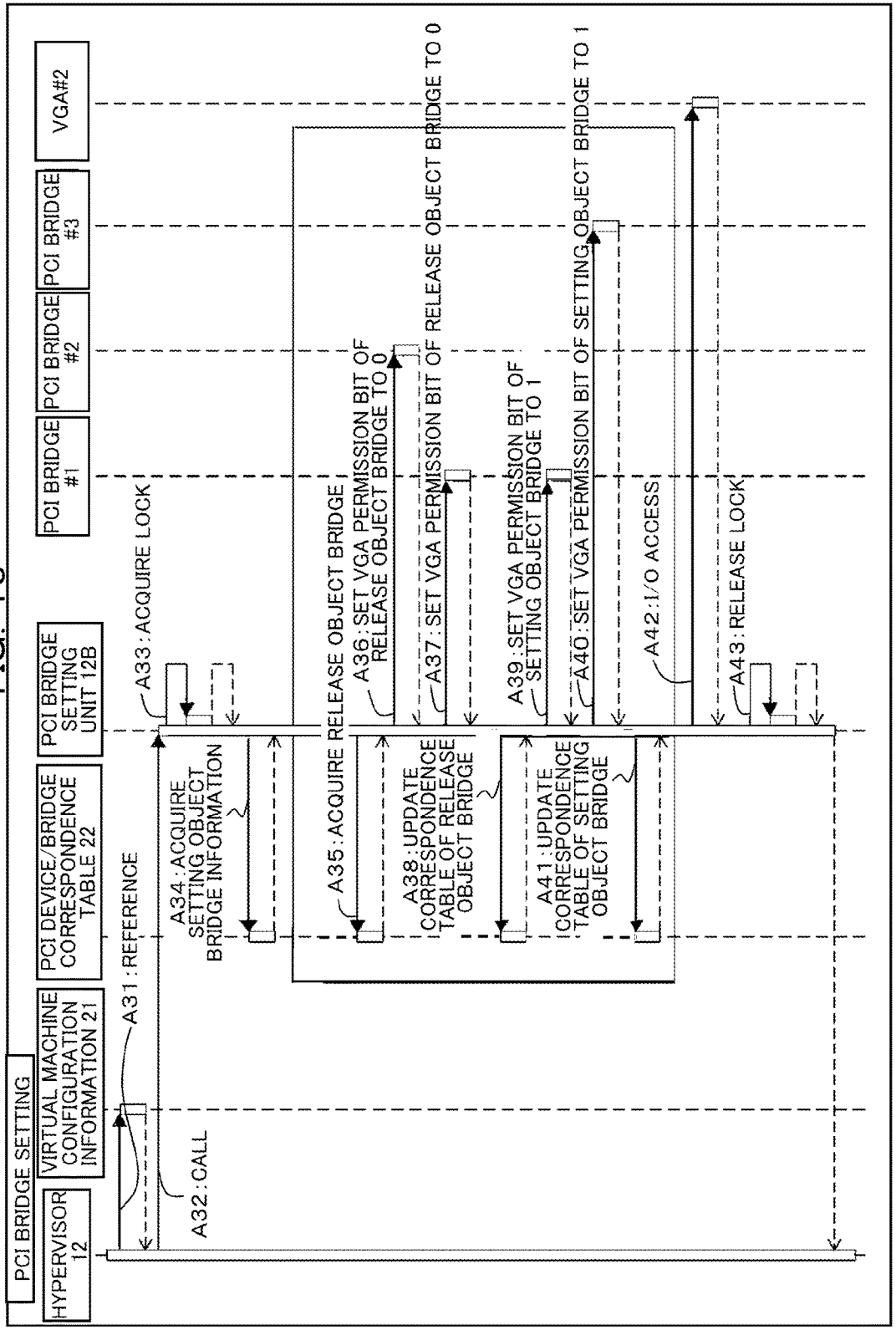
FIG. 10 is a detailed sequence diagram describing a PCI bridge setting process by the information processing apparatus illustrated in FIG. 1.
Figure 11:
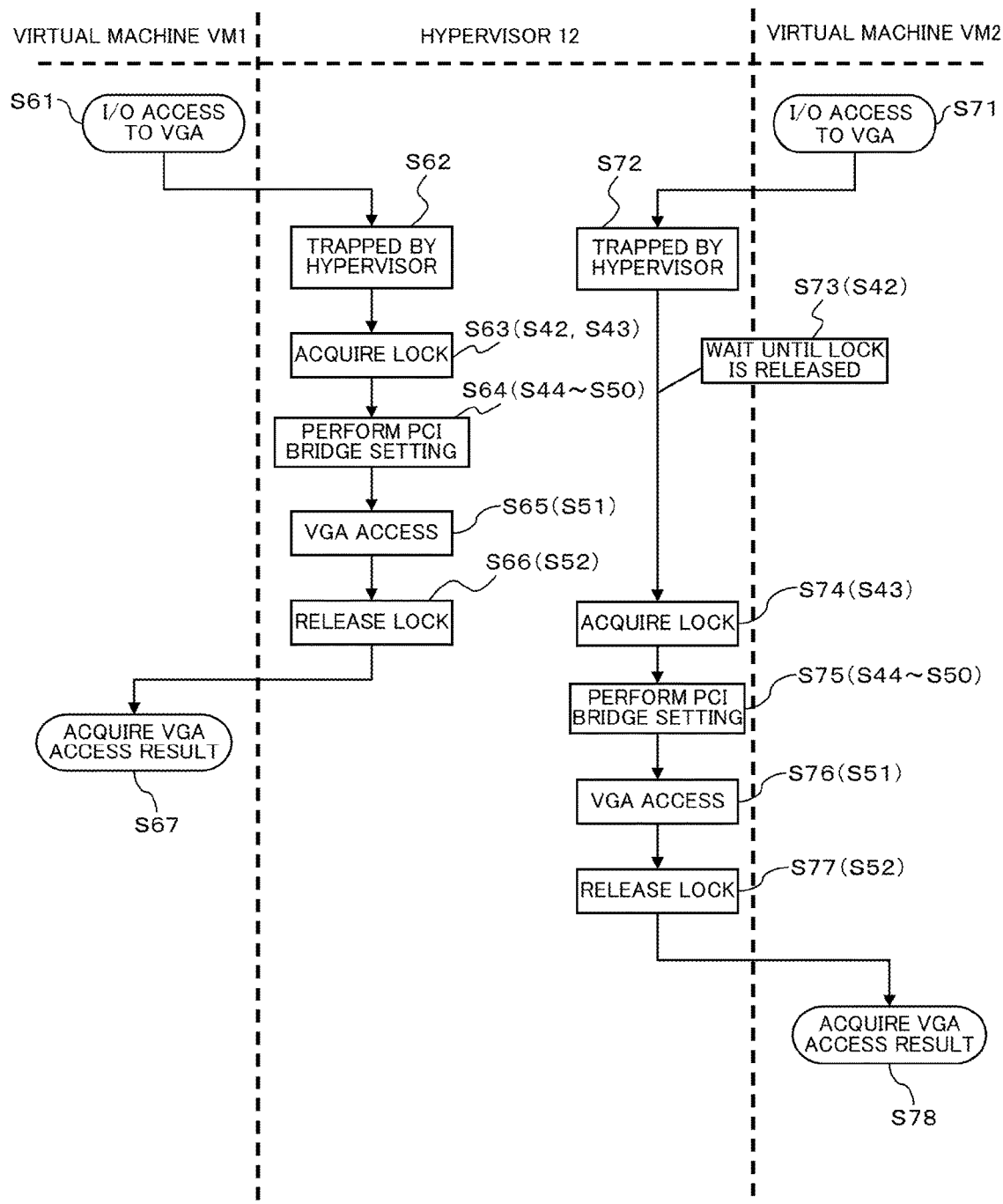
FIG. 11 is a flowchart describing the exclusive use of the correspondence table by a virtual machine of the information processing apparatus illustrated in FIG. 1.

When started, first, the PCI bridge setting unit 12B refers to and updates the correspondence table 22, based on the acquired ID of the VGA card 83, and performs the setting process on the PCI bridge 71 (steps S44 to S50 of FIG. 9; see the arrows A35 to A41 of FIG. 10). Therefore, the PCI bridge setting unit 12B sets the state of the PCI bridge 71 (the state of the VGA permission bit 71B) to a state in which only the I/O access from the virtual machine (CPU 10) to the VGA card 83 to be accessed is possible.

[5-2] Exclusive Control of Correspondence Table

While the correspondence table 22 is referred to and updated according to the request for I/O access from one of the virtual machines VM1 to VM4 to the VGA card 83, a request for I/O access from another virtual machine to the VGA card 83 can occur. In this case, when the process of referring to and updating the correspondence table 22 is simultaneously performed, the correspondence table 22 is not matched. Therefore, when the setting process is performed by the PCI bridge setting unit 12B, the exclusive control of the correspondence table 22 is desired.

The PCI bridge setting unit 12B of the present embodiment performs the exclusive control of the correspondence table 22 by using a shared storage area taking a value of "1" or "0" called a mutex variable (see the mutex variable 23 on the memory 20). When the PCI bridge setting unit 12B traps the request for I/O access from the respective virtual machines to the VGA card 83, the PCI bridge setting unit 12B accesses the mutex variable 23 and performs the exclusive process.

[5-2-1] Acquisition of Lock

First, the PCI bridge setting unit 12B checks the value of the mutex variable 23 on the memory 20 (step S42 of FIG. 9). In a case where the value of the mutex variable 23 is "1" (YES route of step S42 of FIG. 9), the correspondence table 22 is used for the process according to the access from another virtual machine, which is precedent to the present access. Therefore, the PCI bridge setting unit 12B makes the present access wait until the value of the mutex variable 23 becomes "0".

A case where the value of the mutex variable 23 is "0" (NO route of step S42 of FIG. 9) indicates that no virtual machine use the correspondence table 22. In this case, the PCI bridge setting unit 12B acquires a lock by setting the value of the mutex variable 23 from "0" to "1" so as to switch to a state indicating that the correspondence table 22 is being used (lock; step S43 of FIG. 9; see the arrow A33 of FIG. 10). In this state, as described above, an other virtual machine waits for the process until the value of the mutex variable 23 becomes "0". Therefore, the virtual machine having acquired the mutex, that is, the virtual machine having switched the value of the mutex variable 23 to "1", can exclusively use the correspondence table 22.

[5-2-2] Release of Lock

When the process on the correspondence table 22 (steps S44 to S50 of FIG. 9; see the arrows A35 to A41 of FIG. 10) is finished and the I/O access to the VGA card 83 is completed (step S51 of FIG. 9; see the arrow A42 of FIG. 10), the PCI bridge setting unit 12B releases the lock. That is, the PCI bridge setting unit 12B releases the lock by returning the value of the mutex variable 23 from "0" to "1" (step S52 of FIG. 9; see the arrow A43 of FIG. 10). Therefore, an other virtual machine having waited till now can acquire the mutex and use the correspondence table 22.

Herein, the exclusive use of the correspondence table 22 by the virtual machines VM1 and VM2 of the computer system 1 will be described with reference to a flowchart illustrated in FIG. 11 (steps S61 to S78).

First, the virtual machine VM1 requests the I/O access to the VGA card #1 (step S61). When the request for the I/O access is trapped by the hypervisor 12 (step S62), the PCI bridge setting unit 12B acquires the lock of the I/O access (step S63; steps S42 and S43 of FIG. 9). The PCI bridge setting process is performed by the PCI bridge setting unit 12B (step S64; steps S44 to S50 of FIG. 9). When the access to the VGA card #1 is performed (step S65; step S51 of FIG. 9), the PCI bridge setting unit 12B releases the lock (step S66; step S52 of FIG. 9). Thereafter, the result of the access to the VGA card #1 is acquired by the virtual machine VM1 (step S67; step S19 of FIG. 4).

In this case, at the same time as the request for the I/O access to the VGA card #1 by the virtual machine VM1, the virtual machine VM2 requests the I/O access to the VGA card #2 (step S71). In this case, the request for the I/O access to the VGA card #2, which is slightly later than the request for the I/O access to the VGA card #1, is trapped by the hypervisor 12 (step S72). In this case, in the request for the I/O access to the VGA card #2 by the virtual machine VM2, the PCI bridge setting unit 12B cannot immediately acquire the lock and waits until the lock of the preceding access request is released (step S73; YES route of step S42 of FIG. 9).

Thereafter, when the lock of the preceding access request is released (step S66), the PCI bridge setting unit 12B acquires the lock of the I/O access to the VGA card #2 (step S74; step S43 of FIG. 9). The PCI bridge setting process is performed by the PCI bridge setting unit 12B (step S75; steps S44 to S50 of FIG. 9). When the access to the VGA card #2 is performed (step S76; step S51 of FIG. 9), the PCI bridge setting unit 12B releases the lock (step S77; step S52 of FIG. 9). Thereafter, the result of the access to the VGA card #2 is acquired by the virtual machine VM2 (step S78; step S19 of FIG. 4).

[5-3] Acquisition of Setting Object Bridge

The PCI bridge setting unit 12B sequentially checks the ID of the VGA card 83 of the correspondence table 22, and specifies a row matched with the ID of the VGA card 83 to be accessed, which is obtained in step S41, in the correspondence table 22. At the specified row, the value of the permission bit (passage setting information) indicating whether or not to permit the passage of the path from the CPU 10 to the VGA card 83 to be accessed is acquired, and the bridge registered at the corresponding row is acquired as the setting object bridge (step S44 of FIG. 9; see the arrow A34 of FIG. 10).

Hereinafter, a detailed process described with reference to the arrows A35 to A42 of FIG. 10 is a process of a case where the virtual machine VM2 accesses the VGA card #2 assigned thereto in the state illustrated in FIGS. 2 and 3. In this case, the PCI bridge setting unit 12B sequentially checks the ID of the VGA card 83 of the correspondence table 22, and specifies a row matched with the VGA card #2 in the correspondence table 22. The value "0" of the permission bit of the row matched with the VGA card #2 is acquired in the correspondence table 22 illustrated in FIG. 2. Also, the PCI bridges #1 and #3 are acquired as the setting object bridges at the corresponding row.

[5-4] Determination of Permission Bit and Process According to Determination Result The PCI bridge setting unit 12B determines whether or not the value of the permission bit corresponding to the ID of the VGA card 83 to be accessed, which is acquired from the correspondence table 22, is "1" (step S45 of FIG. 9).

[5-4-1] Case where Permission Bit is "1"

In a case where the permission bit corresponding to the ID of the VGA card 83 to be accessed is "1" (YES route of step S45), the PCI bridge setting unit 12B performs the I/O access to the VGA card 83 to be accessed this time, without updating the permission bit of the correspondence table 22 or the VGA permission bits 71B of the respective bridges 71 (step S51 of FIG. 9).

For example, in the state illustrated in FIGS. 2 and 3, in a case where the virtual machine VM1 accesses the VGA card #1 assigned thereto, the permission bit of the VGA card #1 is "1". Therefore, the PCI bridge setting unit 12B performs the I/O access to the VGA card 1 to be accessed this time, without updating the permission bit of the correspondence table 22 or the VGA permission bits 71B of the respective bridges 71.

As described above, when the I/O access to the VGA card 83 (#1) is completed, the PCI bridge setting unit 12B releases the lock by returning the value of the mutex variable 23 from "1" to "0" (step S52 of FIG. 9; see the arrow A43 of FIG. 10). The hypervisor 12 notifies the virtual machine VM1 of the result of the access to the VGA card 83 (#1) to be accessed.

[5-4-2] Case where Permission Bit is "0"

In a case where the permission bit corresponding to the ID of the VGA card 83 to be accessed is "0" (NO route of step S45 of FIG. 9), the bridge 71 on the path from the CPU 10 to the VGA card 83 to be accessed does not transfer the request for I/O access to the bus of the downstream. In this state, the request for I/O access does not reach the VGA card 83 to be accessed. Therefore, it is necessary to set "1" to the VGA permission bit of the bridge 71 on the path from the CPU 10 to the VGA card 83 to be accessed and set "0" to the VGA permission bits of the remaining bridges 71. The PCI bridge setting unit 12B performs the following process on the bridge 71 and the correspondence table 22.

First, the PCI bridge setting unit 12B sequentially checks the value of the permission bit in the correspondence table 22, and acquires the bridge registered at the row, of which the value of the permission bit is "1", as the release object bridge (step S46 of FIG. 9). In the examples illustrated in FIGS. 2, 3, and 10, the VGA card #1, of which the value of the permission bit is "1", is found, and the PCI bridges #1 and #2 of the corresponding row are acquired as the release object bridges (see the arrow A35 of FIG. 10).

Thereafter, the PCI bridge setting unit 12B sets the values of the VGA permission bits 71B of all the release object bridges, which are specified in step S46, from "1" to "0" (step S47 of FIG. 9). At this time, the VGA permission bits 71B of the bridges #1 to #5 are all set to "0". In the examples illustrated in FIGS. 2, 3, and 10, the values of the VGA permission bits 71B in the PCI bridges #2 and #1 acquired as the release object bridges are set from "1" to "0" (see the arrows A36 and A37 of FIG. 10).

The PCI bridge setting unit 12B updates the value of the permission bit of the row of the release object bridge from "1" to "0" in the correspondence table 22 (step S48 of FIG. 9). In the examples illustrated in FIGS. 2, 3, and 10, the value of the permission bit of the row where the release object bridges #1 and #2 are registered are updated from "1" to "0" in the correspondence table 22 (see the arrow A38 of FIG. 10).

The PCI bridge setting unit 12B sets the values of the VGA permission bits 71B of all the setting object bridges, which are acquired in step S44, from "0" to "1" (step S49 of FIG. 9). At this time point, the request for I/O access to the VGA card 83 to be accessed can be transmitted. In the examples illustrated in FIGS. 2, 3, and 10, the values of the VGA permission bits 71B in the PCI bridges #1 and #3 acquired as the setting object bridges are set from "0" to "1" (see the arrows A39 and A40 of FIG. 10).

The PCI bridge setting unit 12B updates the value of the permission bit of the row of the setting object bridge from "0" to "1" in the correspondence table 22 (step S48 of FIG. 9). In the examples illustrated in FIGS. 2, 3, and 10, the value of the permission bit of the row (the row of the VGA card #2) where the setting object bridges #1 and #3 are specified are updated from "0" to "1" in the correspondence table 22 (see the arrow A41 of FIG. 10).

As described above, the request for I/O access to the VGA card 83 to be accessed is transmitted by the setting process of step S49, and the I/O access to the VGA card 83 to be accessed is performed (step S51 of FIG. 9). In the examples illustrated in FIGS. 2, 3, and 10, the request for I/O access to the VGA card #2 to be accessed is transmitted, and the I/O access to the VGA card #2 to be accessed is performed (see the arrow A42 of FIG. 10).

As described above, when the process on the correspondence table 22 is finished and the I/O access to the VGA card 83 (#2) is completed, the PCI bridge setting unit 12B releases the lock by returning the value of the mutex variable 23 from "1" to "0" (step S52 of FIG. 9; see the arrow A43 of FIG. 10). The hypervisor 12 notifies the virtual machine VM2 of the result of the access to the VGA card 83 (#2) to be accessed.

Figure 12:
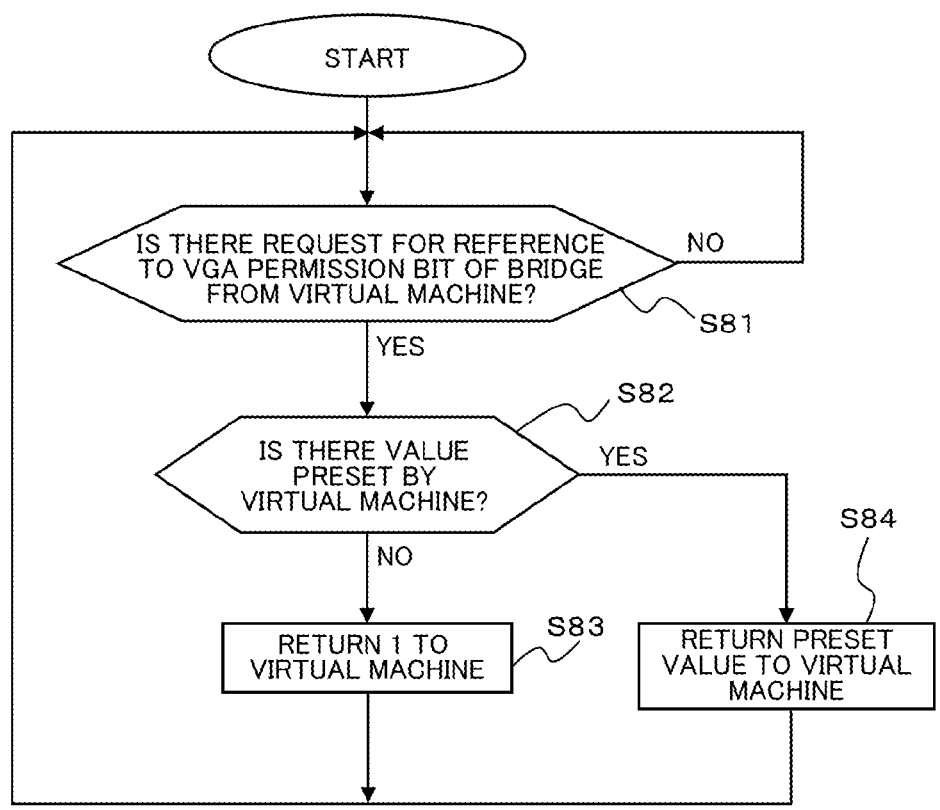
FIG. 12 is a flowchart describing a process when the virtual machine of the information processing apparatus illustrated in FIG. 1 makes a request for reference to a VGA permission bit of a PCI bridge.
Figure 13:
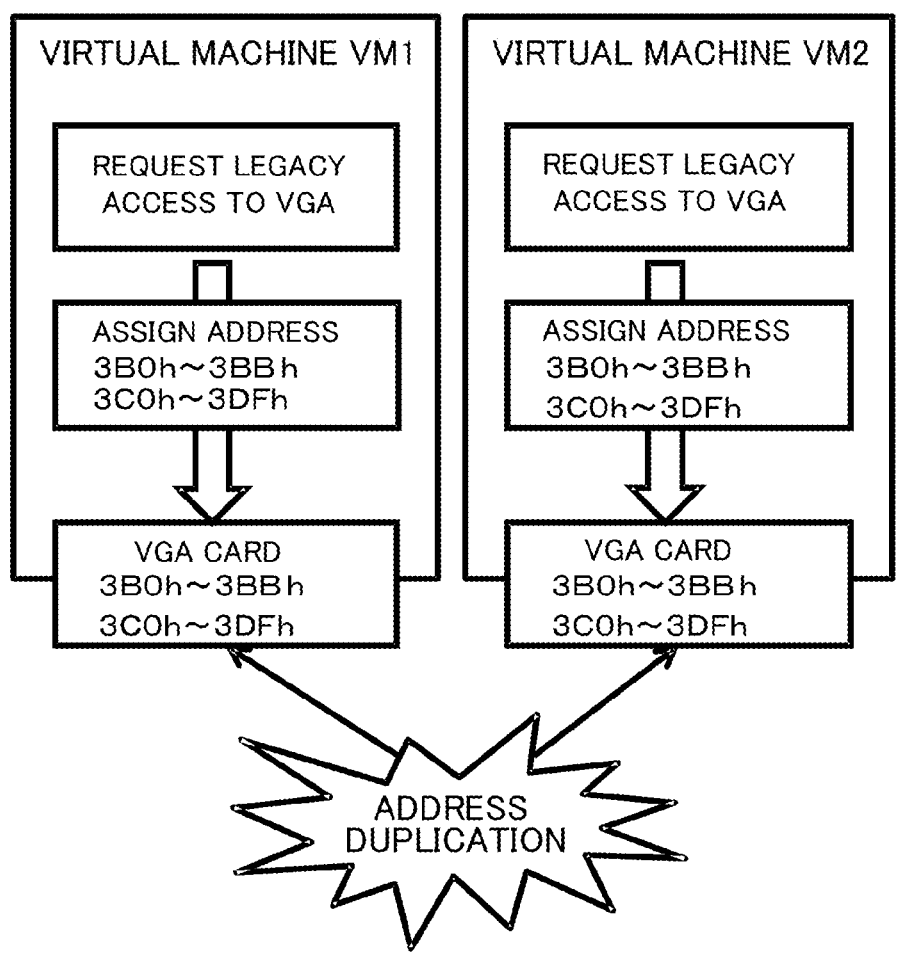
FIG. 13 is a diagram describing address duplication or collision caused by a request for an access to a VGA card in a computer system.
Figure 14:
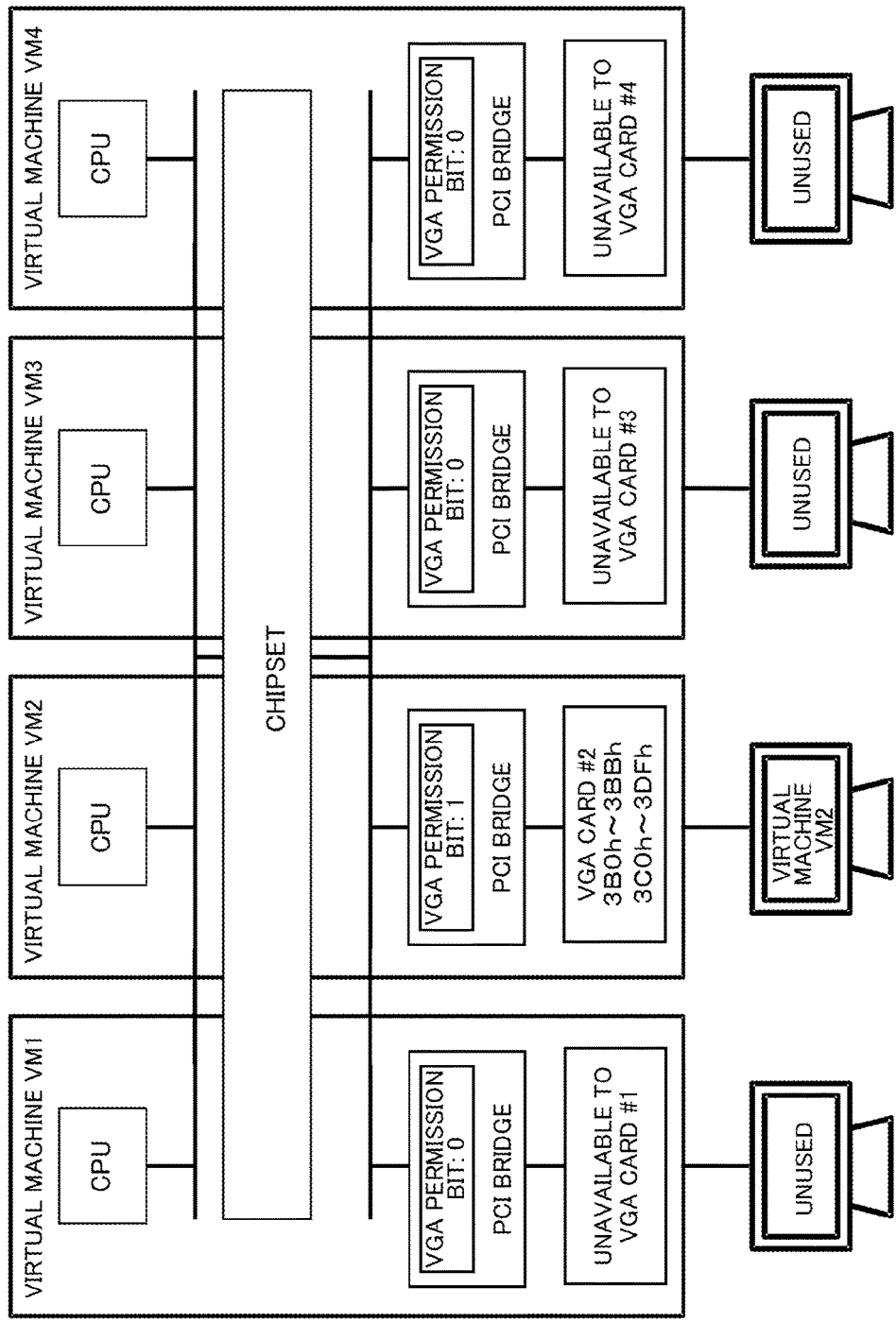
FIG. 14 is a block diagram illustrating a first example of a method for suppressing address duplication or collision.

[6] Process when Virtual Machine Performs Request for Reference to VGA Permission Bit of PCI Bridge Next, the process when the virtual machines VM1 to VM4 of the computer system 1 requests the reference to the VGA permission bit 71B of the PCI bridge 71 will be described with reference to a flowchart illustrated in FIG. 12 (steps S81 to S84).

Also, the hypervisor 12 monitors whether or not the virtual machines VM1 to VM4 issues the request for reference to the states (the values of the VGA permission bits 71B) of the bridges 71 connected to the VGA cards #1 to #4 assigned thereto (step S81). When the hypervisor 12 receives the request for reference to the VGA permission bit 71B of the bridge 71 (YES route of step S81), the hypervisor 12 determines whether or not the value of the return value (state) is preset by the virtual machine (step S82).

In a case where the return value is not preset (NO route of step S82), the hypervisor 12 returns "1" indicating the state of permitting the signal passage to the virtual machine of the reference request source, regardless of the state of the bridge 71 (the value of the VGA permission bit 71B) (step S83). On the other hand, in a case where the return value is preset (YES route of step S82), the hypervisor 12 returns the return value "1" or "0" to the virtual machine of the reference request source, regardless of the state of the bridge 71 (the value of the VGA permission bit 71B) (step S84).

In a case where the request for reference to the state of the bridge 71 (value of the VGA permission bit 71B) connected to the VGA card 83 allocated thereto is received from the virtual machine, if the return value is not preset, "1" indicating the state of permitting the signal passage is returned to the virtual machine. Therefore, on each virtual machine side, it looks as if the VGA card 83 allocated thereto is always connected.

When the state of the bridge 71 referred by each of the virtual machines is "0", each of the virtual machines notifies an error such as failure to communicate with the VGA card 83 allocated thereto and malfunction occurring in the bridge 71, which may cause a trouble in the process of the computer system 1. However, in the present embodiment, as described above, on each virtual machine side, it looks as if the VGA card 83 assigned thereto is always connected. Therefore, the error as described above is not notified, and no trouble is caused in the process of the computer system 1.

[7] Effect of Computer System of Present Embodiment

According to the above-described computer system 1 of the present embodiment, the hypervisor 12 traps the request for I/O access from the respective virtual machines and changes the setting of the VGA permission bit 71B of the PCI bridge 71, based on the correspondence table 22. That is, upon request for I/O access from the respective virtual machines, the resetting of the VGA permission bits 71B in the respective bridges 71 is performed.

Therefore, in the computer system 1 of the present embodiment, collision of I/O addresses can be avoided while maintaining the state of connecting the plurality of devices (legacy devices) with fixed I/O addresses to the plurality of virtual machines. That is, even when a plurality of actual VGAs are mounted, the hypervisor 12 can access the VGA cards 83 assigned to the respective virtual machines, while avoiding duplication of I/O addresses. In this case, on each virtual machine side, it looks as if the VGA card 83 always exists.

Also, according to the present embodiment, upon request for I/O access by the virtual machine, the hypervisor 12 controls the states of the VGA permission bits 71B of the PCI bridges 71. Therefore, the respective VGA cards 83 can maintain the state of being connected to the virtual machines and achieve the high-speed switching of the states of the VGA permission bits 71B or the VGA cards 83 to be accessed by the CPU 10.

Furthermore, when the function as the PCI device/bridge correspondence table creating unit 12A and the PCI bridge setting unit 12B of the present embodiment is realized, it is unnecessary to newly add specific hardware, and thus, costs of additional hardware are not required.

Also, after the OS of the virtual machine is started, the access to the frame buffer of the VGA or the access to the device setting or the like is basically performed by a MMIO method. Upon access by the MMIO method, a separate address is used to each VGA. Therefore, it is unnecessary to perform the setting process of the VGA permission bit or the like, and the overhead of the setting process of the VGA permission bit is eliminated.

[8] Others

While the preferred embodiments of the present invention have been described in detail, the present invention is not limited to specific embodiments and various modifications and changes can be made without departing from the scope of the present invention.

Also, while the embodiments have been described in detail, based on specific examples illustrated in FIGS. 2, 3, 6, 8, and 10, the present invention is not limited to the specific examples illustrated in FIGS. 2, 3, 6, 8, and 10.

Also, in the above-described embodiments, the case where the plurality of devices (legacy devices), to which the same I/O address is assigned, are VGAs (video devices) has been described, but the present invention is not limited thereto. According to the present invention, the above-described embodiments can also be equally applied to legacy devices other than the VGAs, and the same effects as those of the above-described embodiments can be obtained.

All or part of the various functions of the information processing apparatus 1 of the present embodiment, including the PCI device/bridge correspondence table creating unit 12A and the PCI bridge setting unit 12B, can be realized by causing a computer (including a CPU, an information processing apparatus, and various terminals) to execute a predetermined program.

The program is provided to in a form recorded in a computer-readable recording medium, such as flexible disk, CD (CD-ROM, CD-R, CD-RW, etc.), DVD (DVD-ROM, DVD-RAM, DVD-R, DVD-RW, DVD+R, DVD+RW, etc.), Blu-ray disk, or the like. In this case, the computer reads the program from the recording medium and transfers and stores the program to an internal storage device or an external storage device.

Note that the computer is a concept including hardware and operating system (OS) and means hardware that operates under the control of the OS. Also, when hardware is operated only by an application program without the need of the OS, the hardware itself corresponds to the computer. The hardware includes at least a microprocessor such as CPU, and a unit that reads computer programs recorded in the recording medium. The program includes program codes for realizing various functions of the information processing apparatus 1 of the present embodiment on the above-described computer. Also, some of the functions are realized by the OS instead of the application program.

According to an embodiment, collision of I/O addresses can be avoided while maintaining a state of connecting a plurality of devices with fixed I/O addresses to a plurality of virtual machines.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a processor that constructs a plurality of virtual machines;
   a plurality of physical devices each of which assigns a same I/O address; and
   a plurality of bridges that connect the processor and the plurality of physical devices,
   wherein the processor creates correspondence information that manages, in association with identification information of the respective physical devices, identification information of the bridges on respective paths from the processor to the respective physical devices and passage setting information indicating whether or not to permit passages of the respective paths, and
   when one access from one virtual machine among the plurality of virtual machines to one physical device among the plurality of physical devices allocated to the one virtual machine is detected, the processor refers to the correspondence information, sets the passage setting information of the correspondence information and a state of the bridge on the path such that the passage of the path from the processor to the one physical device is permitted, based on the identification information of the bridges and the passage setting information associated with the identification information of the one physical device in the correspondence information, and executes the one access; wherein when receiving a request to read the states of the respective bridges from the respective virtual machines, the processor determines whether or not a first value indicating a state for replying to the request is set as the states of the respective bridges in advance by the respective virtual machines, and returns a second value indicating the state of permitting the passage as the states of the respective bridges to the respective virtual machines when the first value indicating the state for replying to the request is not set in advance, or returns the first value indicating the state for replying to the request as the states of the respective bridges to the respective virtual machines when the first value is set in advance.

2. The information processing apparatus according to claim 1, wherein when the passage setting information of the path from the processor to the one physical device is in a state of denying the passage of the path, the processor sets the passage setting information of remaining paths other than the corresponding path and states of the bridges on the remaining paths to a state of denying the passage, sets the passage setting information of the corresponding path and the state of the bridge on the corresponding path to a state of permitting the passage, and executes the one access.

3. The information processing apparatus according to claim 1, wherein when the passage setting information of the path from the processor to the one physical device is in a state of permitting the passage of the corresponding path, the processor executes the one access.

4. The information processing apparatus according to claim 1, wherein when an other access from an other virtual machine to an other physical device is detected between the detection of the one access and the completion of the execution of the one access, the processor makes the processing of the other access wait until the execution of the one access is completed.

5. A method of controlling an information processing apparatus, the method comprising:
   when controlling the information processing apparatus including a processor that constructs a plurality of virtual machines, a plurality of physical devices each of which assigns a same I/O address, and a plurality of bridges that connect the processor and the plurality of physical devices, creating correspondence information that manages, in association with identification information of the respective physical devices, identification information of the bridges on respective paths from the processor to the respective physical devices and passage setting information indicating whether or not to permit passages of the respective paths;
   when one access from one virtual machine among the plurality of virtual machines to one physical device among the plurality of physical devices allocated to the one virtual machine is detected, referring to the correspondence information, setting the passage setting information of the correspondence information and a state of the bridge on the path such that the passage of the path from the processor to the one physical device is permitted, based on the identification information of the bridges and the passage setting information associated with the identification information of the one physical device in the correspondence information, and executing the one access;
   when receiving a request to read the states of the respective bridges from the respective virtual machines,
   determining whether or not a first value indicating a state for replying to the request is set as the states of the respective bridges in advance by the respective virtual machines, and
   returning a second value indicating the state of permitting the passage as the states of the respective bridges to the respective virtual machines when the first value indicating the state for replying to the request is not set in advance, or returning the first value indicating the state for replying to the request as the states of the respective bridges to the respective virtual machines when the first value is set in advance.

6. The method of controlling the information processing apparatus according to claim 5, further comprising:
   setting, when the passage setting information of the path from the processor to the one physical device is in a state of denying the passage of the path, the passage setting information of remaining paths other than the corresponding path and states of the bridges on the remaining paths to a state of denying the passage;
   setting the passage setting information of the corresponding path and the state of the bridge on the corresponding path to a state of permitting the passage; and
   executing the one access.

7. The method of controlling the information processing apparatus according to claim 5, further comprising executing, when the passage setting information of the path from the processor to the one physical device is in a state of permitting the passage of the corresponding path, the one access.

8. The method of controlling the information processing apparatus according to claim 5, further comprising making, when an other access from an other virtual machine to an other physical device is detected between the detection of the one access and the completion of the execution of the one access, the processing of the other access wait until the execution of the one access is completed.

9. A non-transitory computer-readable recording medium having stored therein a program for causing a computer to execute a process for controlling an information processing apparatus, the process comprising:

when controlling the information processing apparatus including a processor that constructs a plurality of virtual machines, a plurality of physical devices each of which assigns a same I/O address, and a plurality of bridges that connect the processor and the plurality of physical devices, creating correspondence information that manages, in association with identification information of the respective physical devices, identification information of the bridges on respective paths from the processor to the respective physical devices and passage setting information indicating whether or not to permit passages of the respective paths;

when one access from one virtual machine among the plurality of virtual machines to one physical device among the plurality of physical devices allocated to the one virtual machine is detected, referring to the correspondence information, setting the passage setting information of the correspondence information and a state of the bridge on the path such that the passage of the path from the processor to the one physical device is permitted, based on the identification information of the bridges and the passage setting information associated with the identification information of the one physical device in the correspondence information, and executing the one access;

when receiving a request to read the states of the respective bridges from the respective virtual machines, determining whether or not a first value indicating a state for replying to the request is set as the states of the respective bridges in advance by the respective virtual machines, and returning a second value indicating the state of permitting the passage as the states of the respective bridges to the respective virtual machines when the first value indicating the state for replying to the request is not set in advance, or returning the first value indicating the state for replying to the request as the states of the respective bridges to the respective virtual machines when the first value is set in advance.

10. The non-transitory computer-readable recording medium having stored therein the program according to claim 9, the process further comprising:

setting, when the passage setting information of the path from the processor to the one physical device is in a state of denying the passage of the path, the passage setting information of remaining paths other than the corresponding path and states of the bridges on the remaining paths to a state of denying the passage;

setting the passage setting information of the corresponding path and the state of the bridge on the corresponding path to a state of permitting the passage; and executing the one access.

11. The non-transitory computer-readable recording medium having stored therein the program according to claim 9, the process further comprising:

executing, when the passage setting information of the path from the processor to the one physical device is in a state of permitting the passage of the corresponding path, the one access.

12. The non-transitory computer-readable recording medium having stored therein the program according to claim 9, the process further comprising:

making, when an other access from an other virtual machine to an other physical device is detected between the detection of the one access and the completion of the execution of the one access, the processing of the other access wait until the execution of the one access is completed.

* * * * *